(12) United States Patent
Shibahara et al.

(10) Patent No.: US 10,085,043 B2
(45) Date of Patent: Sep. 25, 2018

(54) IMAGE DECODING METHOD AND IMAGE DECODING APPARATUS

(71) Applicant: Panasonic Corporation, Osaka (JP)

(72) Inventors: Youji Shibahara, Osaka (JP); Takahiro Nishi, Nara (JP)

(73) Assignee: SUN PATENT TRUST, New York, NY (US)

( * ) Notice: Subject to any disclaimer, the term of this patent is extended or adjusted under 35 U.S.C. 154(b) by 268 days.

(21) Appl. No.: 14/259,366

(22) Filed: Apr. 23, 2014

(65) Prior Publication Data

US 2014/0334556 A1    Nov. 13, 2014

(30) Foreign Application Priority Data

May 9, 2013    (JP) ................................. 2013-099003

(51) Int. Cl.
| | | |
|---|---|---|
| *H04N 19/46* | (2014.01) | |
| *H04N 19/44* | (2014.01) | |
| *H04N 19/65* | (2014.01) | |
| *H04N 19/895* | (2014.01) | |

(52) U.S. Cl.
CPC ........... *H04N 19/895* (2014.11); *H04N 19/44* (2014.11)

(58) Field of Classification Search
CPC combination set(s) only.
See application file for complete search history.

(56) References Cited

U.S. PATENT DOCUMENTS

| | | | | |
|---|---|---|---|---|
| 2004/0234143 A1* | 11/2004 | Hagai | .................. | H04N 19/105 |
| | | | | 382/238 |
| 2005/0105809 A1* | 5/2005 | Abe | .................. | H04N 19/00763 |
| | | | | 382/236 |
| 2006/0083298 A1* | 4/2006 | Wang | .................. | H04N 19/196 |
| | | | | 375/240.01 |
| 2008/0175326 A1 | 7/2008 | Ohbitsu | | |

(Continued)

FOREIGN PATENT DOCUMENTS

| | | |
|---|---|---|
| JP | 2007-184791 | 7/2007 |
| JP | 2008-177907 | 7/2008 |

(Continued)

OTHER PUBLICATIONS

"Information technology—Coding of audio-visual objections—Part 10: Advanced Video Coding", International Standard, ISO/IEC 14496-10, Second Edition, Oct. 1, 2004, pp. 1-267.

(Continued)

*Primary Examiner* — Anand S Rao
*Assistant Examiner* — Samuel D Fereja
(74) *Attorney, Agent, or Firm* — Wenderoth, Lind & Ponack, L.L.P.

(57) ABSTRACT

An image decoding method includes: obtaining first reference picture information from a coded signal; determining whether or not a second reference picture identified by the first reference picture information is stored in a buffer; determining, when the second reference picture is not stored in the buffer, a picture stored in the buffer to be a third reference picture; and decoding a current picture from the coded signal using a fifth reference picture selected from one or more fourth reference pictures including the third reference picture instead of the second reference picture.

8 Claims, 27 Drawing Sheets

(56) References Cited

U.S. PATENT DOCUMENTS

| | | | | |
|---|---|---|---|---|
| 2010/0034254 | A1* | 2/2010 | Wang | H04N 19/134 375/240.01 |
| 2010/0142617 | A1* | 6/2010 | Koo | H04N 19/597 375/240.16 |
| 2010/0208828 | A1* | 8/2010 | Lu | H04N 19/46 375/240.25 |
| 2011/0286531 | A1* | 11/2011 | Okajima | H04N 19/597 375/240.25 |
| 2013/0058408 | A1* | 3/2013 | Wahadaniah | H04N 19/70 375/240.12 |
| 2013/0094772 | A1* | 4/2013 | Deshpande | H04N 19/70 382/233 |
| 2013/0114743 | A1* | 5/2013 | Sjoberg | H04N 19/00903 375/240.26 |
| 2013/0188881 | A1* | 7/2013 | Zhao | H04N 19/463 382/232 |
| 2013/0215975 | A1* | 8/2013 | Samuelsson | H04N 19/70 375/240.25 |
| 2014/0126640 | A1* | 5/2014 | Samuelsson | H04N 19/00515 375/240.16 |
| 2014/0219332 | A1* | 8/2014 | Yang | H04N 19/423 375/240.02 |
| 2016/0014419 | A1* | 1/2016 | Bordes | H04N 19/30 375/240.24 |

FOREIGN PATENT DOCUMENTS

| | | |
|---|---|---|
| JP | 2009-94815 | 4/2009 |
| JP | 2009-296078 | 12/2009 |

OTHER PUBLICATIONS

Benjamin Bross et al., "High Efficiency Video Coding (HEVC) text specification draft 10 (for FDIS & Last Call)", Joint Collaborative Team on Video Coding (JCT-VC) of ITU-T SG16 WP3 and ISO/IEC JTC1/SC29/WG11 12$^{th}$ Meeting: Geneva, CH, Jan. 14-23, 2013, JCTVC-L1003, http://phenix.int-evry.fr/jct/doc_end_user/documents/12_Geneva/wg11/JCTVC-L1003-v34.zip.

"Information technology—Coding of audio-visual objects—Part 10: Advanced Video Coding", International Standard, ISO/IEC 14496-10, Second Edition, Oct. 1, 2004, pp. 1-267.

\* cited by examiner

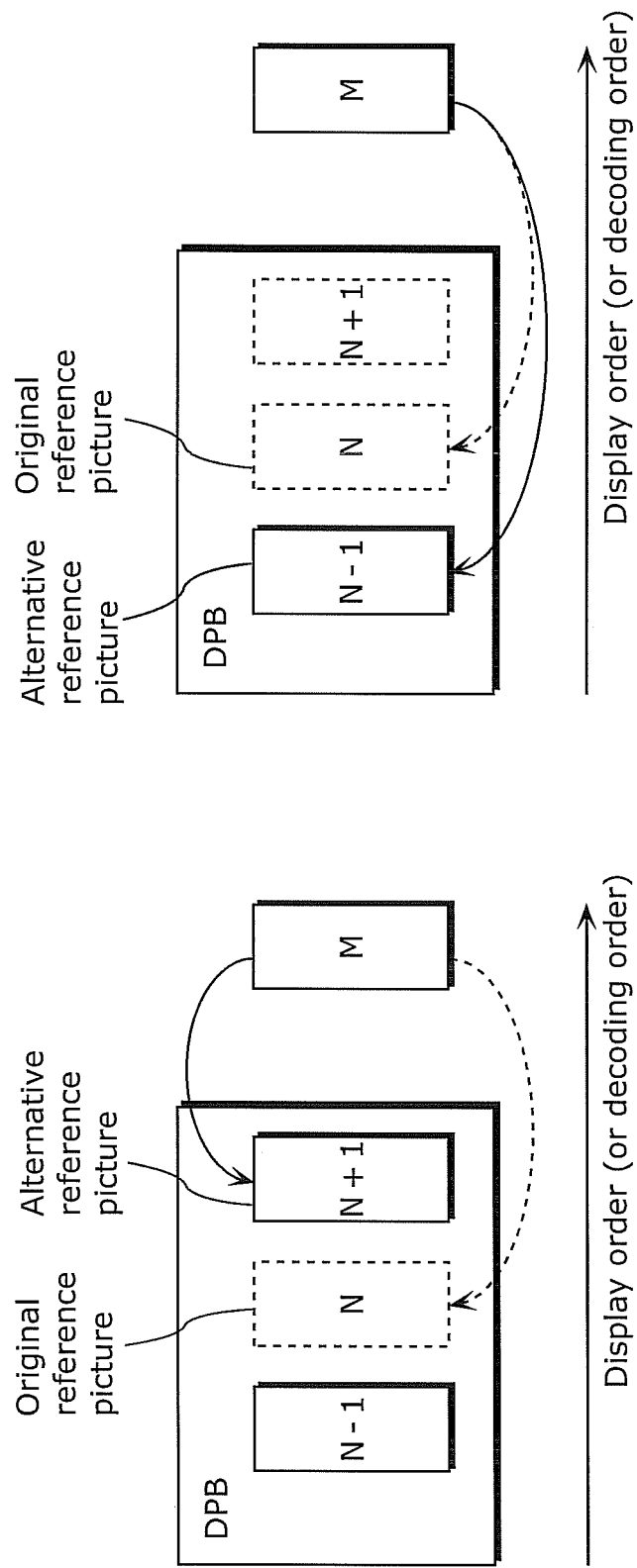

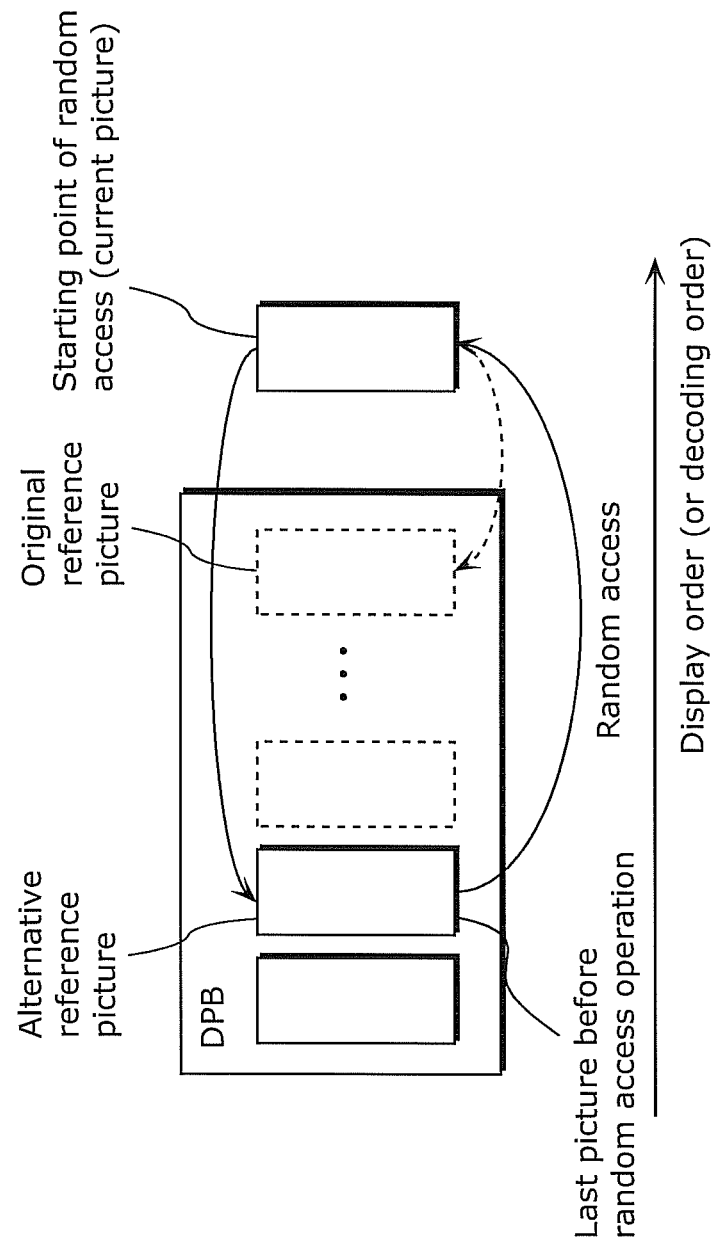

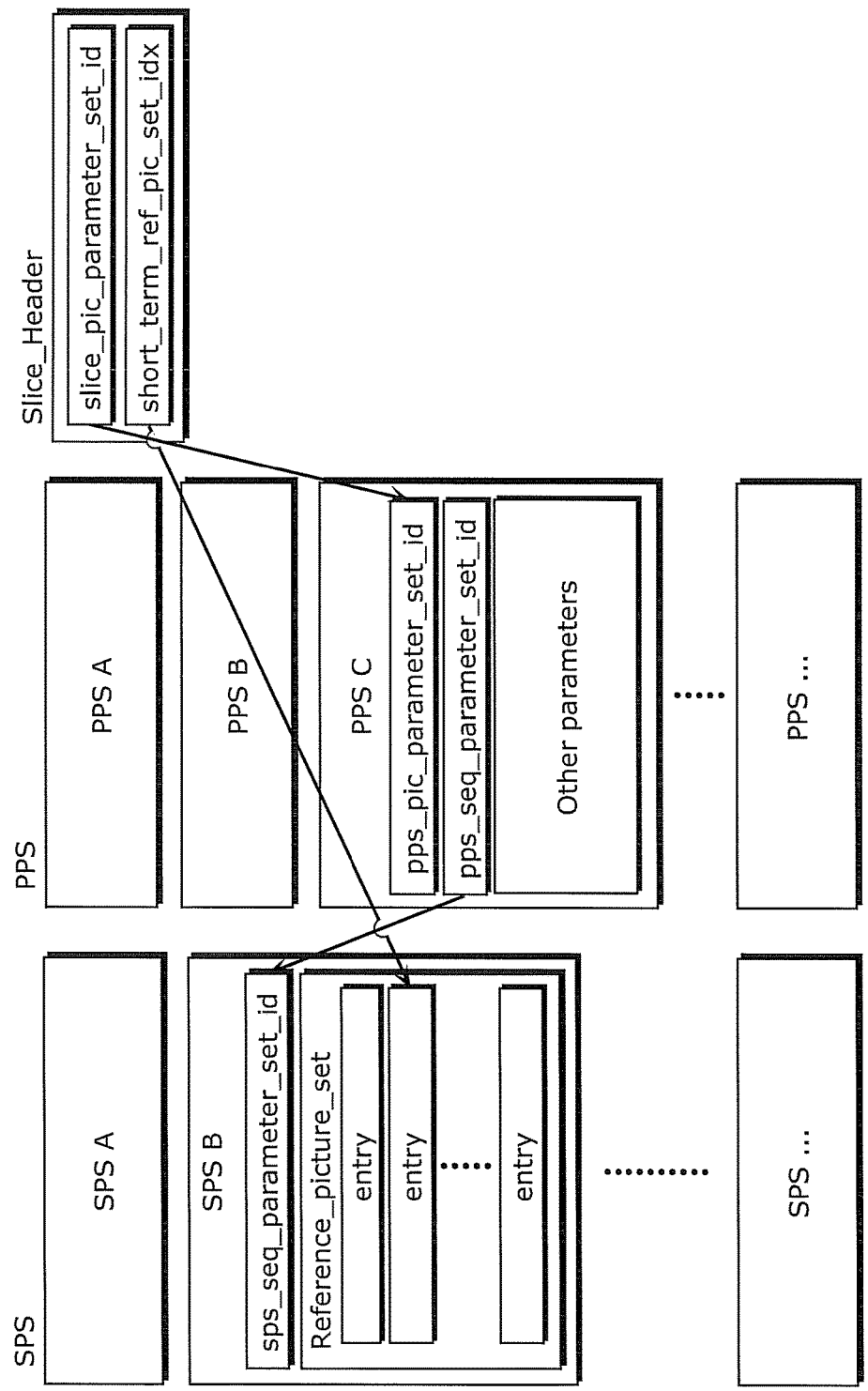

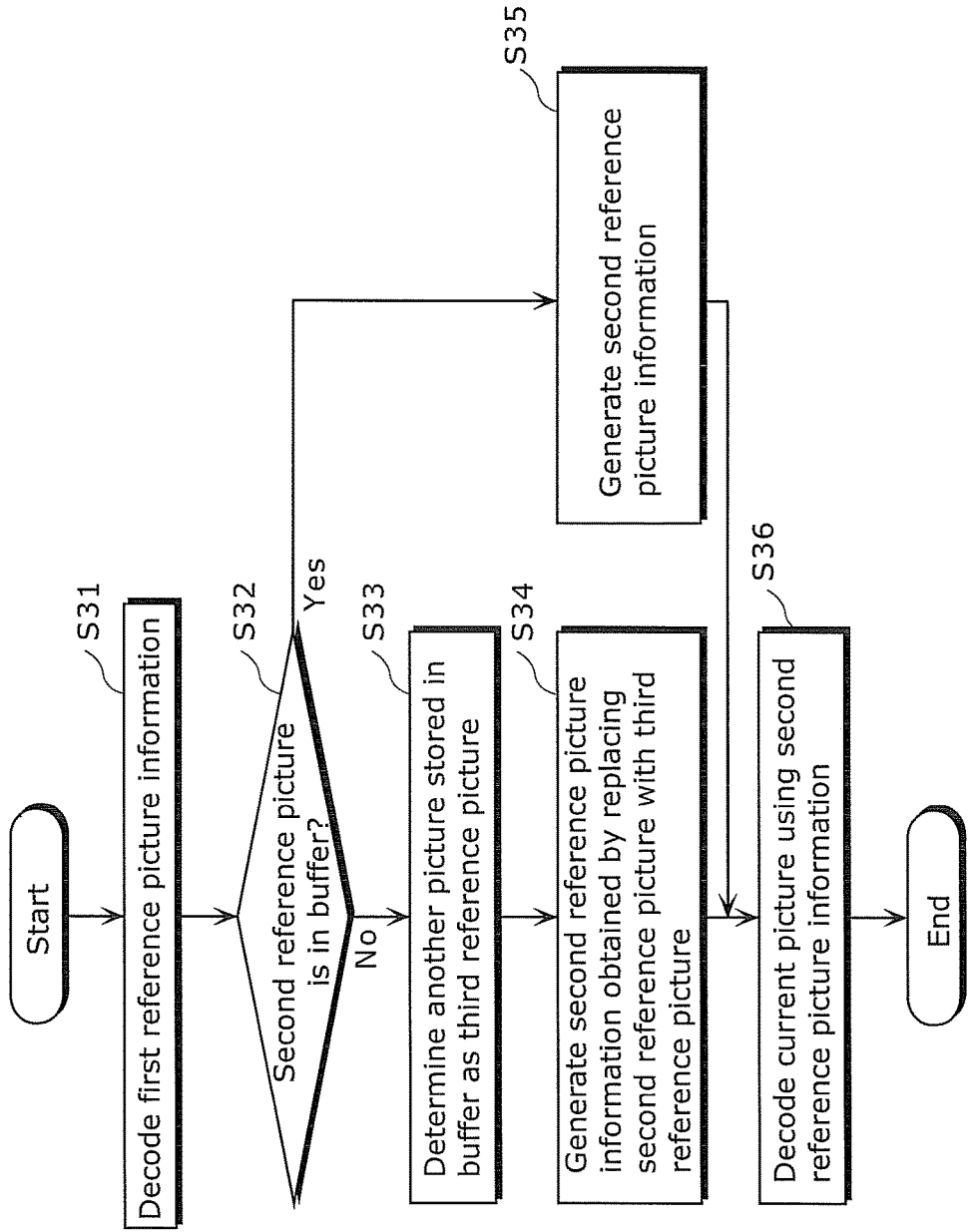

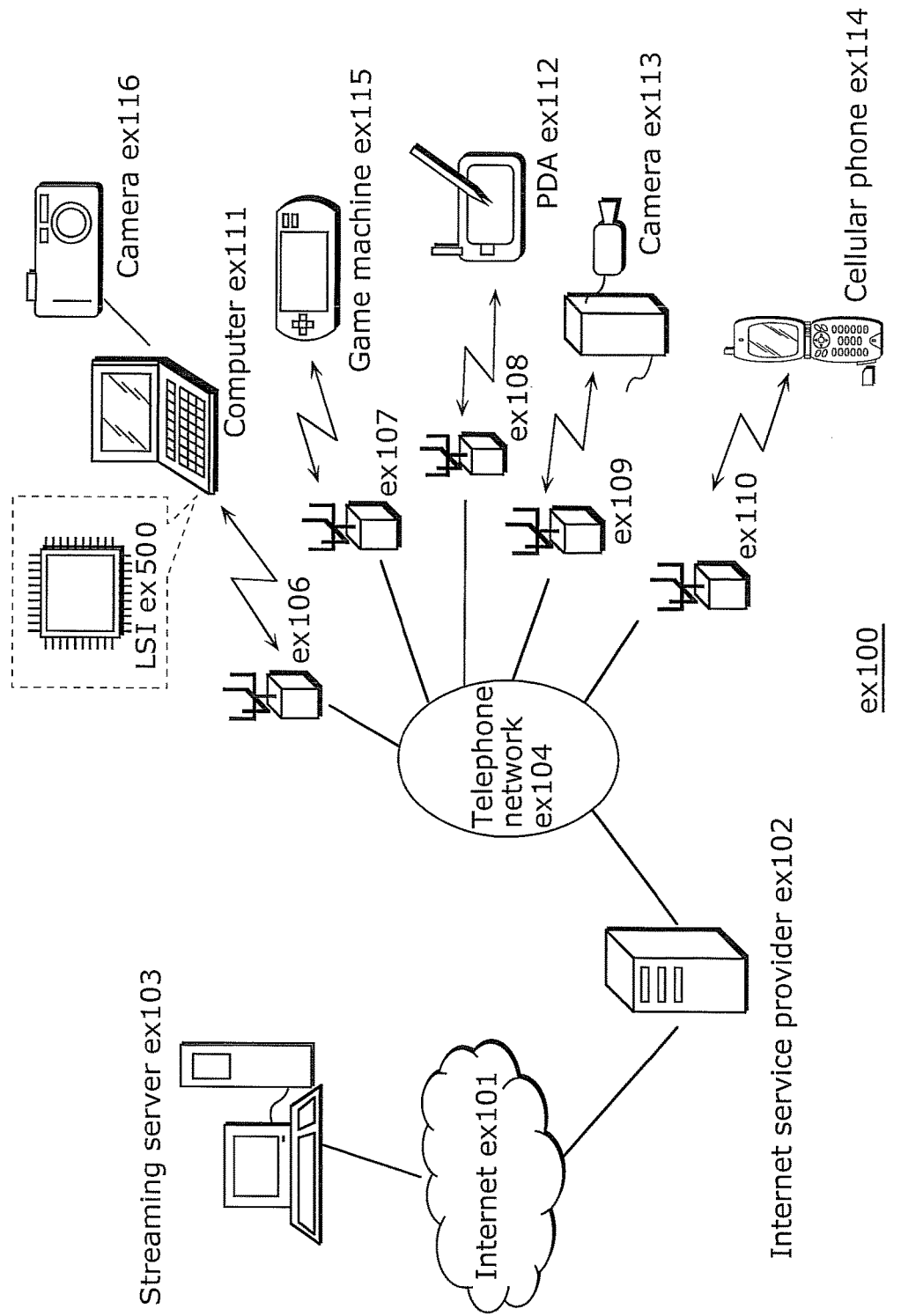

FIG. 16

| |
|---|
| Video stream (PID=0x1011, Primary video) |
| Audio stream (PID=0x1100) |
| Audio stream (PID=0x1101) |
| Presentation graphics stream (PID=0x1200) |
| Presentation graphics stream (PID=0x1201) |
| Interactive graphics stream (PID=0x1400) |
| Video stream (PID=0x1B00, Secondary video) |
| Video stream (PID=0x1B01, Secondary video) |

FIG. 19
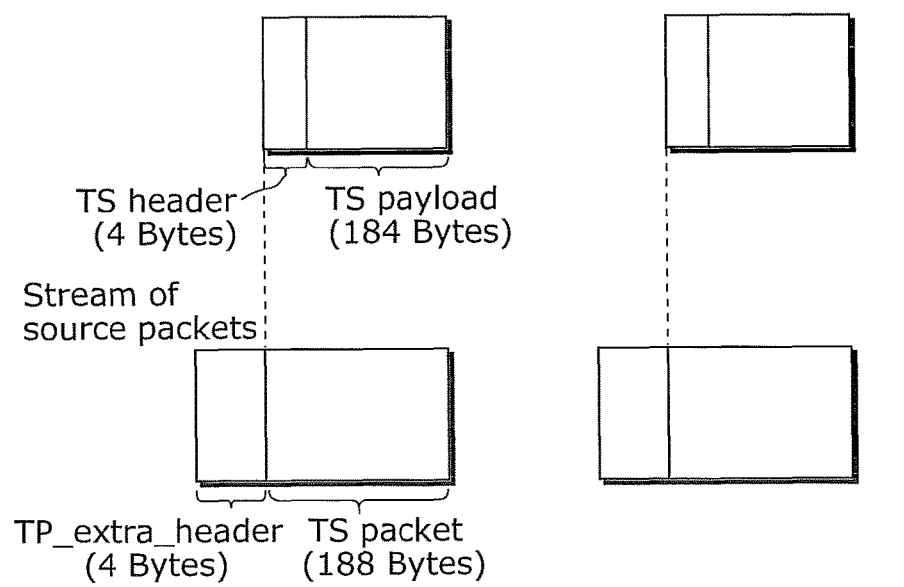
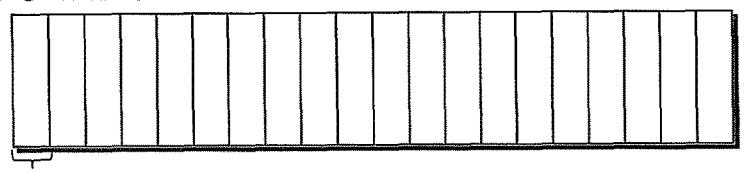

Data structure of PMT ex800

FIG. 27

| Corresponding standard | Driving frequency |
|---|---|
| MPEG-4 AVC | 500 MHz |
| MPEG-2 | 350 MHz |
| ⋮ | ⋮ |

IMAGE DECODING METHOD AND IMAGE DECODING APPARATUS

CROSS REFERENCE TO RELATED APPLICATION

The present application claims the benefit of Japanese Patent Application No. 2013-099003 filed on May 9, 2013. The entire disclosure of the above-identified application, including the specification, drawings and claims is incorporated herein by reference in its entirety.

FIELD

The present disclosure relates to an image decoding method and an image decoding apparatus.

BACKGROUND

Audio coding standards and moving picture coding standards have been developed for compressing audio data and moving picture data. As an example of the moving picture coding standards, there are ITUT standards called H.26x standards as well as ISO/IEC standards called MPEG-x (for example, refer to Non Patent Literature 1). The most recent and advanced video coding standard is currently the standard denoted as H.264/MPEG-4 advanced video coding (AVC). In recent years, a video coding standard referred to as High-Efficiency Video Coding (HEVC) has been examined as a next-generation coding standard (refer to Non Patent Literature 2).

CITATION LIST

Non Patent Literature

[NPL 1] ISO/IEC 14496-10 "MPEG-4 Part 10 Advanced Video Coding"
[NPL 2] Joint Collaborative Team on Video Coding (JCT-VC) of ITU-T SG16 WP3 and ISO/IEC JTC1/SC29/WG11 12th Meeting: Geneva, CH, 14-23 Jan. 2013, JCTVC-L1003, High Efficiency Video Coding (HEVC) text specification draft 10, http://phenix.int-evry.fr/jct/doc_end_user/documents/12_Geneva/wg11/JCTVC-L1003-v34.zip

SUMMARY

Technical Problem

It is desirable that an image decoding method and an image decoding apparatus make it possible to reduce degradation of image quality when a coded signal has an error.

One non-limiting and exemplary embodiment provides an image decoding method or an image decoding apparatus which makes it possible to reduce degradation of image quality when a coded signal has an error.

Solution to Problem

An image decoding method according to an aspect of the present disclosure is an image decoding method for decoding a coded signal, the image decoding method including: decoding first reference picture information for identifying one or more first reference pictures, from a picture header included in the coded signal; determining whether or not a second reference picture is stored in a buffer, the second reference picture being one of the one or more first reference pictures; determining, when the second reference picture is not stored in the buffer, a third reference picture which is stored in the buffer and different from the second reference picture; and decoding a current picture from the coded signal, using a fifth reference picture selected from one or more fourth reference pictures which include the third reference picture instead of the second reference picture.

General and specific aspects disclosed above may be implemented using a system, a method, an integrated circuit, a computer program, or a computer-readable recording medium such as a CD-ROM, or any combination of systems, methods, integrated circuits, computer programs, or computer-readable recording media.

Additional benefits and advantages of the disclosed embodiments will be apparent from the Specification and Drawings. The benefits and/or advantages may be individually obtained by the various embodiments and features of the Specification and Drawings, which need not all be provided in order to obtain one or more of such benefits and/or advantages.

Advantageous Effects

One non-limiting and exemplary embodiment disclosed herein provides an image decoding method or an image decoding apparatus which makes it possible to reduce degradation of image quality when a coded signal has an error.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 5 is a diagram illustrating an example of an alternative picture selection operation according to Embodiment 1.
FIG. 6 is a diagram illustrating another example of the alternative picture selection operation according to Embodiment 1.
FIG. 7 is a diagram illustrating another example of the alternative picture selection operation according to Embodiment 1.
FIG. 8 is a diagram for explaining SPS activation according to Embodiment 1.
FIG. 9 is a flowchart illustrating an operation of the image decoding apparatus according to Embodiment 1.
FIG. 10 shows an overall configuration of a content providing system for implementing content distribution services.

FIG. 16 illustrates a structure of multiplexed data.

FIG. 19 shows a structure of TS packets and source packets in the multiplexed data.

FIG. 27 shows an example of a look-up table in which video data standards are associated with driving frequencies.

DESCRIPTION OF EMBODIMENTS (Underlying Knowledge Forming Basis of the Present Disclosure)

In inter-picture prediction, indirect reference is performed on a picture referred by a motion vector in a block layer via a table called a reference picture list. The motion vector has a reference index which is a pointer to the table, and is a reference picture in which an element of the table pointed by the reference index (a pointer to any of the pictures in the DPB) is a reference picture referred by the motion vector. However, there is a possibility that due to an error and editing, a picture which does not exist in the DPB is indicated as a reference destination. The present disclosure will describe an appropriate operation method of a video core layer.

Specifically, in a moving picture coding standard, the redundancy of data is reduced using inter-picture temporal correlation.

To put it simply, compression efficiency can be increased by referring to a picture at the latest display time. However, compression efficiency can be increased for a region covered by a foreground object (occlusion) by referring to a picture having a region which is not temporally close and is not covered any farther. Although bidirectional prediction which averages two reference pictures can increase prediction efficiency, the picture to be referred is not necessarily temporally close when a B picture is used.

As described above, according to content of video to be encoded, a referential picture in inter-picture prediction is variable.

Inter-picture prediction is performed on a basis of block resulting from dividing a picture. In inter-picture prediction for each block, by one motion vector information item in the case of a unidirectional prediction block and by two motion vector information items in the case of a bidirectional prediction block, one or more pictures to be referred and a spatial position in the reference picture are determined. It should be noted that in order to compress data amount for the motion vector information, a difference between a motion vector to be used and a predictive value calculated from a motion vector of a block surrounding the current block is encoded. Furthermore, there is an encoding method called a skip mode in which only the predictive value is used and the difference information is not encoded.

A certain motion vector information item includes reference index (RefIdx) which is index information identifying the reference picture, a motion vector X (MVX) indicating a moving amount in a horizontal direction, a motion vector Y indicating a moving amount in a perpendicular direction. In H.264 or MPEG-2, a picture is divided into block units called macroblocks, and each of the macroblocks is divided into one or more motion compensation blocks, and each of the motion compensation blocks has motion vector information.

Figure 1:
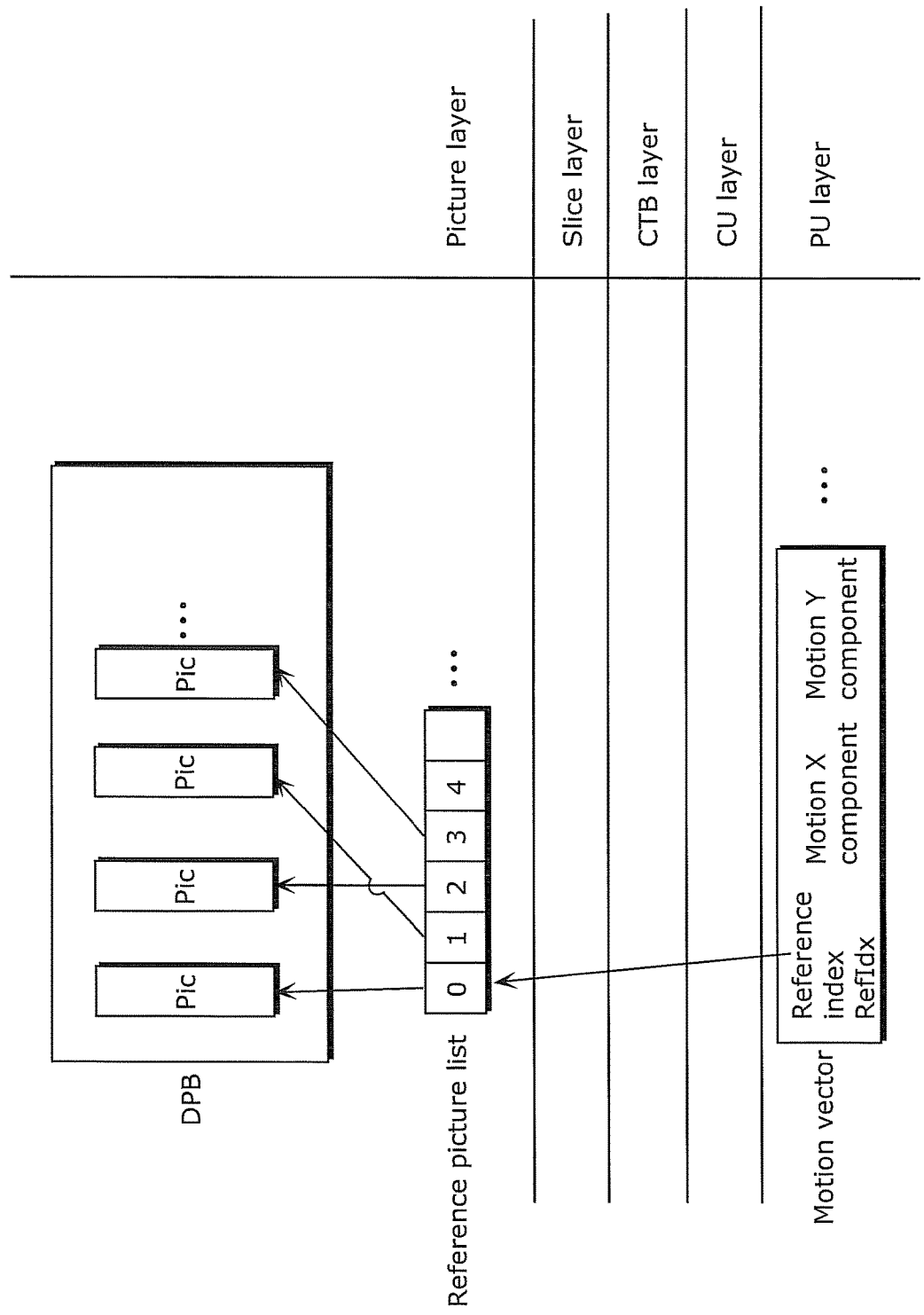
FIG. 1 is an illustration diagram of a reference picture list.

As illustrated in FIG. 1, in HEVC which is a new moving picture coding standard, a picture is divided into slices (there is a case where one slice=one picture), each of the slices is divided into coded tree blocks (CTB), each of the CTBs is divided into coding units (CUs), each of the CUs is divided into prediction units (PUs), and each of the PUs has motion vector information. As described above, there are many motion vector information items in a picture.

The motion vector information does not directly identify the reference picture, and indirect reference is performed on the reference picture via a table called a reference picture list RPL. A picture which is already decoded and can be referred from the subsequent picture is in a decoded picture buffer (DPB). Value of the table of RPL is a pointer to any of the pictures in DPB. Meanwhile, a reference index RefIdx included in the motion vector information is a pointer to an element of RPL (indicates what ordinal number from the head).

Here, due to a transmission error and the like, it is possible that a relationship between the above described RPL state and the picture in DPB is contradictory. In this case, there is a method of generating a monochromatic image such as grey and then using it as a reference picture. However, this method does not make it possible to secure a video quality.

Therefore, the present embodiment will describe an image decoding method or an image decoding apparatus which makes it possible to decode while maintaining the video quality even in the case of a bitstream having a contradiction.

An image decoding method according to an aspect of the present disclosure is an image decoding method for decoding a coded signal, the image decoding method including: decoding first reference picture information for identifying one or more first reference pictures, from a picture header included in the coded signal; determining whether or not a second reference picture is stored in a buffer, the second reference picture being one of the one or more first reference pictures; determining, when the second reference picture is not stored in the buffer, a third reference picture which is stored in the buffer and different from the second reference picture; and decoding a current picture from the coded signal, using a fifth reference picture selected from one or more fourth reference pictures which include the third reference picture instead of the second reference picture.

With this, the image decoding method makes it possible to use another picture as the reference picture even when the reference picture is not stored in the buffer due to an error and the like. With this, the image decoding method makes it possible to reduce degradation of image quality when a coded signal has an error.

For example, the image decoding method may include generating second reference picture information which is used in common in a picture and identifies the one or more reference fourth reference pictures being derived by replacing the second reference picture with the third reference picture, among the one or more first reference pictures, wherein, in the decoding of a current picture, the fifth reference picture may be selected from the one or more fourth reference pictures, using the second reference picture information.

For example, in the determining of a third reference picture, a picture closest in display order to the second reference picture, among pictures stored in the buffer, may be determined to be the third reference picture.

With this, the image decoding method makes it possible to select the picture close in content to the second reference picture as the third reference picture. With this, the image decoding method makes it possible to reduce degradation of image quality when a coded signal has an error.

For example, in the determining of a third reference picture, when a plurality of pictures closest in display order to the second reference picture are present, a picture closest in display order to the current picture, among the plurality of pictures, may be determined to be the third reference picture.

With this, the image decoding method makes it possible to select the picture close in content to the second reference picture as the third reference picture. With this, the image decoding method makes it possible to reduce degradation of image quality when a coded signal has an error.

For example, in the determining of a third reference picture, a picture closest in decoding order to the second reference picture, among pictures stored in the buffer, may be determined to be the third reference picture.

With this, the image decoding method makes it possible to select the picture close in content to the second reference picture as the third reference picture. With this, the image decoding method makes it possible to reduce degradation of image quality when a coded signal has an error.

For example, in the determining of a third reference picture, when a plurality of pictures closest in decoding order to the second reference picture are present, a picture closest in decoding order to the current picture, among the plurality of pictures, may be determined to be the third reference picture.

With this, the image decoding method makes it possible to select the picture close in content to the second reference picture as the third reference picture. With this, the image decoding method makes it possible to reduce degradation of image quality when a coded signal has an error.

For example, when the current picture is a picture which is at a starting point of a random access, in the determining of a third reference picture, a picture last decoded before a random access operation or a picture which is last in display order before the random access operation, among pictures stored in the buffer, may be determined to be the third reference picture.

With this, the image decoding method makes it possible to use another picture as the reference picture even when the reference picture is not stored in the buffer due to an error at a time of random access. With this, the image decoding method makes it possible to reduce degradation of image quality when a coded signal has an error.

For example, in the decoding of a first reference picture: a header of a picture unit may be identified using information which is included in a slice header of a current slice included in the current picture and identifies the header of the picture unit; a header of a unit of pictures may be identified using information which is included in the identified header of the picture unit and identifies the header of the unit of the pictures, the header of the unit of the pictures being the picture header; and the first reference picture information may be obtained from the identified header of the unit of the pictures.

For example, the second reference picture information may be a reference picture list indicating a correspondence relationship between (i) a reference index which is included in the coded signal and indicates a reference picture to be used, and (ii) the reference picture stored in the buffer.

For example, the first reference picture information may be information indicating a difference in display order between each of the one or more first reference pictures and the current picture.

Moreover, an image decoding apparatus according to an aspect of the present disclosure is an image decoding apparatus which decodes a coded signal, the image decoding apparatus including: processing circuitry; and storage accessible from the processing circuitry, wherein the processing circuitry executes, using the storage, the image decoding method.

With this, the image decoding apparatus makes it possible to use another picture as the reference picture even when the reference picture is not stored in the buffer due to an error and the like. With this, the image decoding apparatus makes it possible to reduce degradation of image quality when a coded signal has an error.

Moreover, an image decoding apparatus according to an aspect of the present disclosure is an image decoding apparatus which decodes a coded signal, the image decoding apparatus including: a first reference picture information decoding unit configured to decode first reference picture information for identifying one or more first reference pictures which are referable by a current picture, from a picture header included in the coded signal; a determination unit configured to determine whether or not a second reference picture is stored in a buffer, the second reference picture being one of the one or more first reference pictures; a third reference picture determination unit configured to determine, when the second reference picture is not stored in the buffer, a third reference picture which is stored in the buffer and different from the second reference picture; and a current picture decoding unit configured to decode the current picture from the coded signal, using a fifth reference picture selected from one or more fourth reference pictures which include the third reference picture instead of the second reference picture.

With this, the image decoding apparatus makes it possible to use another picture as the reference picture even when the reference picture is not stored in the buffer due to an error and the like. With this, the image decoding apparatus makes it possible to reduce degradation of image quality when a coded signal has an error.

General and specific aspects disclosed above may be implemented using a system, a method, an integrated circuit, a computer program, or a computer-readable recording medium such as a CD-ROM, or any combination of systems, methods, integrated circuits, computer programs, or computer-readable recording media.

Hereinafter, embodiments are specifically described with reference to the Drawings.

Each of the embodiments described below shows a general or specific example. The numerical values, shapes, materials, structural elements, the arrangement and connection of the structural elements, steps, the processing order of the steps etc. shown in the following embodiments are mere examples, and therefore do not limit the scope of the Claims. Therefore, among the structural elements in the following embodiments, structural elements not recited in any one of the independent claims are described as arbitrary structural elements.

Embodiment 1

Figure 2:
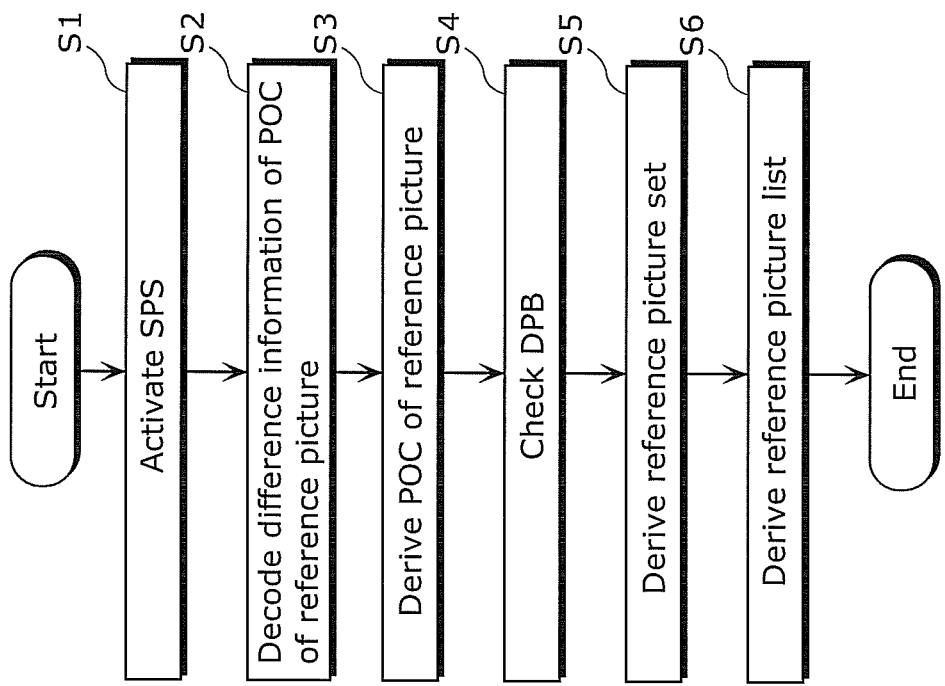
FIG. 2 is a flowchart illustrating an operation of an image decoding apparatus according to Embodiment 1.

FIG. 2 is a flowchart illustrating an image decoding process performed by the image decoding apparatus 100 according to the present embodiment. With reference to FIG. 2, the operation of the image decoding apparatus 100 according to the present embodiment will be described.

The image decoding apparatus 100 decodes a slice header (slice_segment_header) from a bitstream 101 that is inputted. Next, the image decoding apparatus 100 identifies a sequence parameter set SPS to which the picture refers, using information included in the slice header, and then activates (parses) the SPS (Step S1). For example, this process is performed only once on one picture.

Next, the image decoding apparatus 100 decodes difference information of picture order count (POC) of the reference picture from the SPS (Step S2).

Next, the image decoding apparatus 100 derives the POC of the reference picture from the difference information of the POC of the reference picture (Step S3). For example, Step S2 and Step S3 are performed only once on one SPS.

Next, the image decoding apparatus 100 checks whether or not the reference picture indicated by the POC is in the DPB (Step S4).

Next, the image decoding apparatus 100 adds only the existing reference picture to the reference picture set RPS (Step S5). For example, Step S4 and Step S5 are performed only once on one picture.

Next, the image decoding apparatus 100 derives the reference picture list RPL from the reference picture set RPS (Step S6). The reference picture list RPL is a table obtained by rearranging the reference picture sets RPSs according to a predetermined rule, and is equal to the reference picture set RPS in terms of the function of the pointer to the reference picture.

Figure 3:
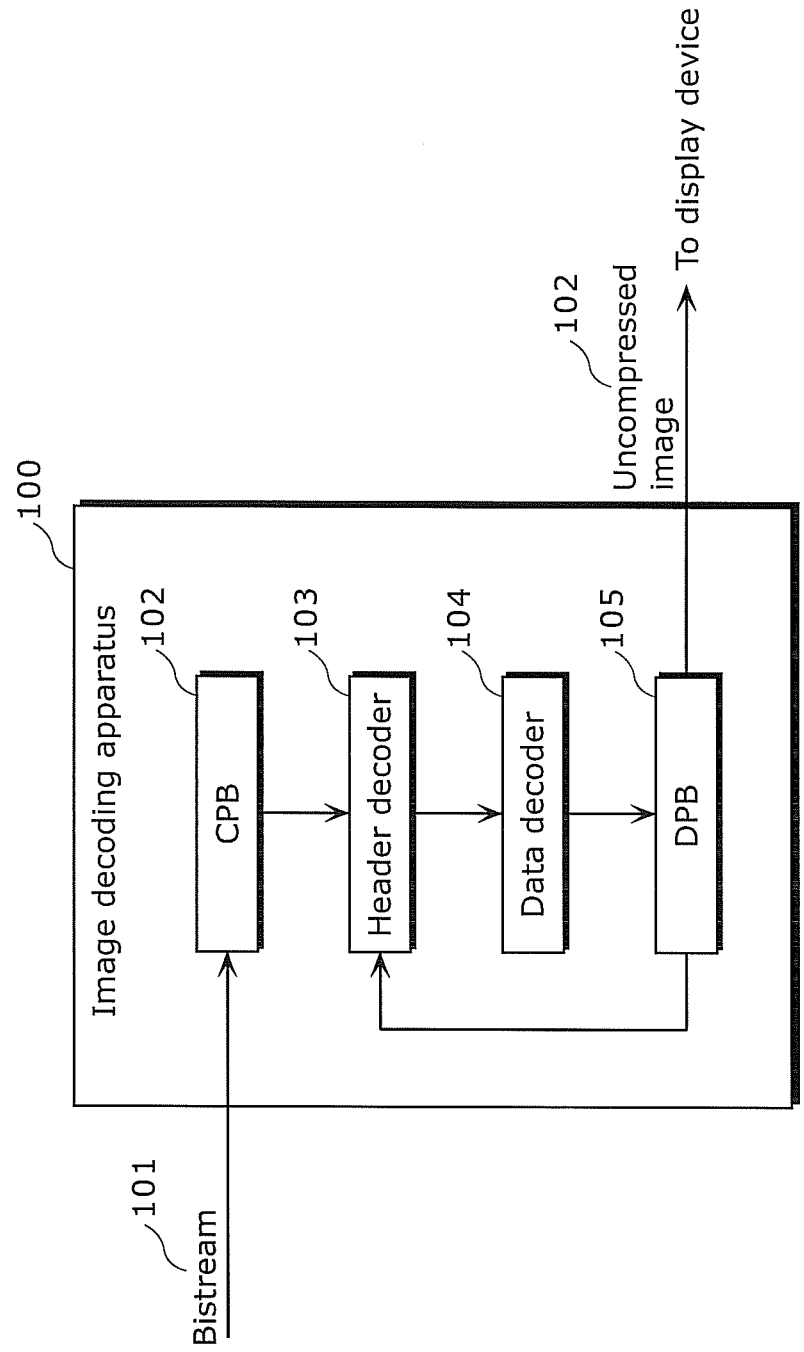
FIG. 3 is a block diagram illustrating a configuration of the image decoding apparatus according to Embodiment 1.

FIG. 3 is a block diagram illustrating a configuration of the image decoding apparatus 100 according to the present embodiment.

The image decoding apparatus 100 generates an uncompressed image (decoded image) 106 by decoding a bitstream 101 (coded signal) obtained by encoding the image. This image decoding apparatus 100, as illustrated in FIG. 3, includes a CPB (coded picture buffer) 102, a header decoder 103, a data decoder 104, and a DPB (decoded picture buffer) 105.

The CPB 102 is a buffer which holds the bitstream 101 inputted to the image decoding apparatus 100. The CPB 102 outputs the bitstream 101 to the header decoder 103 at a predetermined timing for every picture (access unit).

The header decoder 103 parses the syntax for each of NAL header, SPS, PPS, and slice header that are included in the bitstream 101. Specifically, the header decoder 103 decodes the SPS and the PPS, and then stores the obtained SPS and PPS in a memory. Moreover, the header decoder 103 decodes a slice header. The header decoder 103 extracts data necessary to derive the reference picture list RPL from the predetermined field for each of the SPS, the PPS, and the slice header, and then derives the RPL using these data items according to a predetermined method. Furthermore, the header decoder 103 extracts payload data which is data of the video core layer, and then transmits the payload data to the data decoder 104.

The data decoder 104 generates the uncompressed image 106 by decoding the payload data.

The DPB 105 holds the uncompressed image 106 which is a picture decoded by the data decoder 104. This uncompressed image 106 is outputted to a display device and the like in an output order (display order).

Here, the header decoder 103 checks whether or nor the reference picture is in the DPB 105 when deriving the RPL. Then, when there is no reference picture, the header decoder 103 derives the RPL so that an alternative reference picture is used instead of the nonexistent reference picture.

Figure 4:
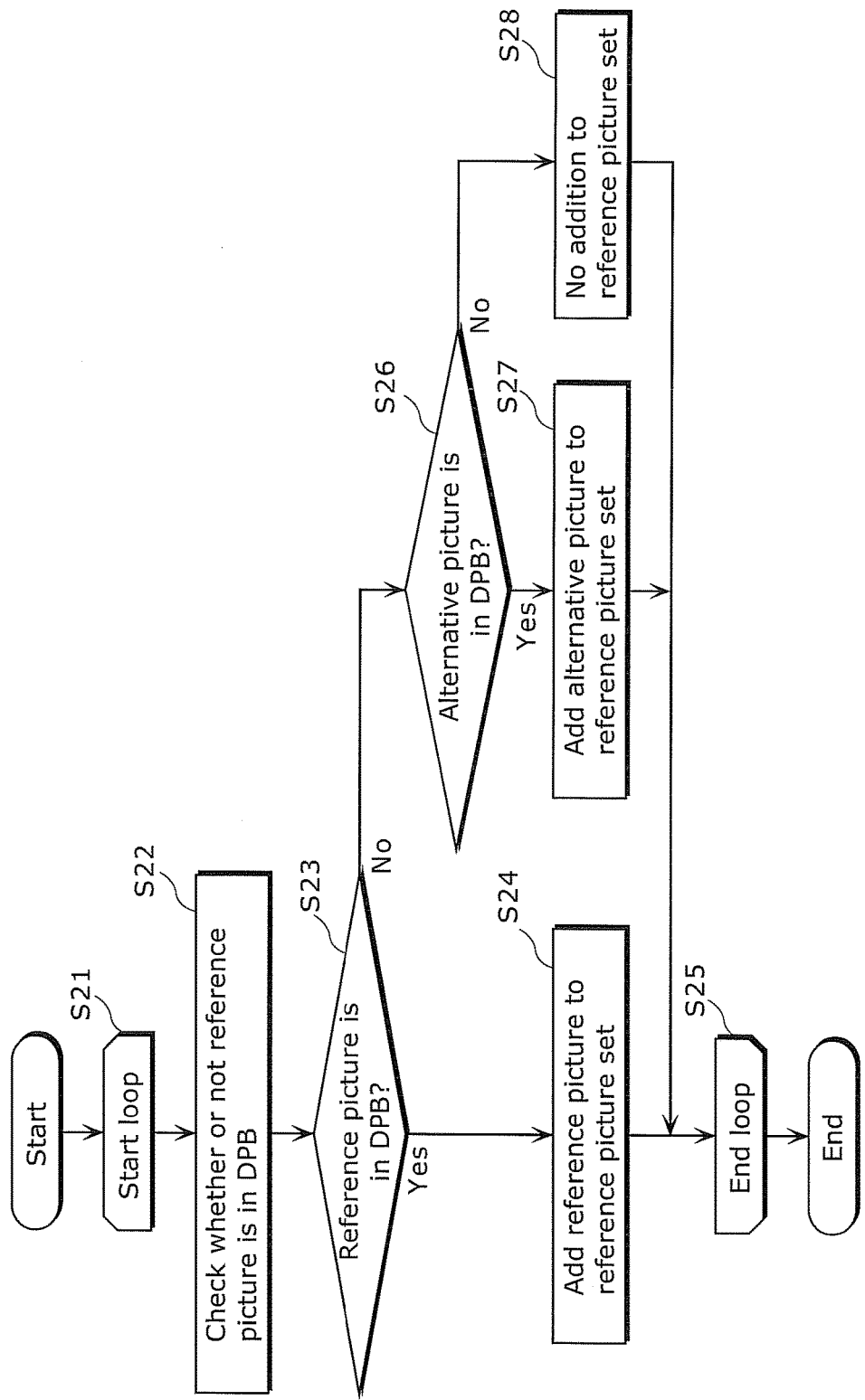
FIG. 4 is a flowchart illustrating an alternative picture determination operation according to Embodiment 1.

The following will describe this alternative picture determination process with reference to FIG. 4. FIG. 4 is a flowchart illustrating an alternative picture determination process according to the present embodiment.

The header decoder 103 performs the following operation on each of the POCs (one or more) of the reference pictures derived in the aforementioned Step S3.

An iteration process is illustrated by Step S21 and Step S25 in FIG. 4.

First, the header decoder 103 checks whether or not the reference picture selected based on the reference index is in the DPB 105 (Step S22). This existence of the reference picture means that the picture data of the POC which matches with the POC of the reference picture is actually held on a memory. It should be noted that the header decoder 103 regards the picture as existent in the DPB 105 even when it is a picture (unused for reference) which was marked by a marking process and marked as unused for reference.

The operation is divided according to a check result of whether the reference picture is in the DPB 105 (Step S23).

When the reference picture is in the DPB 105 (Yes in Step S23), the header decoder 103 adds the reference picture to the reference picture set RPS (Step S24).

When the reference picture is not in the DPB 105 (No in Step S23), the header decoder 103 checks whether or not another alternative picture is in the DPB 105 (Step S26). When the reference picture is in the DPB 105 (Yes in Step S26), the header decoder 103 adds the alternative picture as the reference picture to the RPS (Step S27). When the alternative picture is not in the DPB 105 (No in Step S26), the header decoder 103 does not add anything to the RPS (Step S28).

Next, a method of selecting an alternative reference picture will be described with reference to FIGS. 5 and 6.

When the display order of the original reference picture is N (picture N), the header decoder 103 selects a picture closest to the picture N as the alternative reference picture. Moreover, when a plurality of pictures having the same distance to the picture N are present, the header decoder 103 selects a picture closer to the side of the picture to be decoded.

For example, as illustrated in FIG. 5, when the display order of the current picture to be decoded is M (picture M), the display order of the original reference picture is N (picture N), and there is a relationship of M>N, the original reference picture N is not in the DPB 105, and there are the picture N−1 and the picture N+1 in the DPB 105, the header decoder 103 determines that, of the picture N−1 and the picture N+1, the picture closer to the picture M is the alternative reference picture. Moreover, as illustrated in FIG.

6, when there is no original reference picture N, there is no picture N+1, and there is the picture N−1, the header decoder 103 determines that this picture N−1 is the alternative reference picture.

Moreover, although here describes an example of the case where the picture close to the original reference picture in display order is selected, the picture close to the original reference picture in decoding order may be selected.

Moreover, when decoding of an editing point and an error superposition are combined, the header decoder 103 may determine, as the alternative reference picture, the picture last decoded before the editing point or the picture last in display order before the editing point. Moreover, when a random access operation and an error superposition are combined, the header decoder 103 may determine, as the alternative reference picture, the picture last decoded before the random access operation or the picture last in display order before the random access operation.

FIG. 7 is a diagram illustrating an example of the case where the alternative reference picture is determined when the random access operation and the error superposition are combined. As illustrated in FIG. 7, when the current picture is a picture which is at the starting point of the random access, the header decoder 103 determines that, among the pictures stored in the DPB, the picture last decoded before the random access operation or the picture last in display order before the random access operation is the alternative picture.

Moreover, the header decoder 103 may use, as the alternative reference picture, a picture which is in the DPB 105 and is marked as unused for reference.

As described above, the image decoding apparatus 100 makes it possible to decode an encoded bitstream while reducing degradation of image quality even when the encoded bitstream has an error and there is no reference picture in the DPB 105. Moreover, since the determination of the alternative reference picture is performed in the slice header layer and is not performed on each of the motion vectors in the block layer, there is an advantageous effect of making it possible to decode the bitstream having an error without increasing the processing amount.

The following will describe SPS activation. FIG. 8 is a diagram explaining in detail the SPS activation.

It is possible that there are SPSs and PPSs simultaneously. For example, slice_pic_parameter_set_id in the slice header is an identifier which identifies the PPSs. Each of the PPSs has pps_pic_parameter_sed_id that is unique. Then, the PPS is selected which has pps_pic_parameter_sed_id having the number matching with the number of slice_pic_parameter_set_id in the slice header.

Furthermore, the PPS has pps_seq_parameter_set_id which is an identifier which identifies the SPS. Each of the SPSs has sps_seq_parameter_sed_id that is unique. Then, the SPS is selected which has sps_seq_paramter_sed_id having the number matching with the number of pps_seq_parameter_set_id in the selected PPS.

The SPS stores the POC difference information which is a basis for deriving the RPS and RPL, in the name of Reference_Picture_Set. Reference_Picture_Set can have a plurality of entry. Moreover, any of the plurality of entry is selected by short_term_ref_pic_set_idx in the slice header.

Moreover, separately from the information in the SPS, the information of the RPL can be directly described in the slice header. Even in this case, the header decoder 103 checks whether or not the reference picture directly described in the slice header is in the DPB 105. When there is no reference picture in the DPB 105, the reference picture which does not exist as described above is replaced with the alternative picture.

Moreover, although the present embodiment mainly describes the example of the case where a short term reference is used, the same process can be applied to the case where a long term reference is used. In other words, the same process can be applied to the case where the POC itself is used, instead of the POC difference information.

Moreover, the activation of the SPS and PPS may be performed once after the PPS is switched. Since the RPL and RPS in the same picture are determined to be the same, the derivation of the RPL and RPS may be performed only once on one picture.

It should be noted that the present embodiment may be realized as an image processing method or an image processing apparatus which makes it possible to convert a first coded signal having an error into a second coded signal without an error, by, when there is not reference picture in the DPB 105, rewriting the information in the SPS to refer to the alternative reference picture as described above, or by directly describing the information in the slice header.

As described above, the image decoding apparatus 100 according to the present embodiment performs the operation illustrated in FIG. 9.

First, a first reference picture information decoding unit decodes, from a picture header included in a coded signal (bitstream 101), the first reference picture information for identifying one or more first reference pictures which can be referred by the current picture (Step S31). Here the picture header is, for example, a header of a unit of one or more pictures.

For example, as illustrated in FIG. 8, the first reference picture information decoding unit identifies the header of the picture unit (for example, PPS), using information identifying the header of the picture unit (PPS) included in the slice header of the current slice included in the current picture. Next, the first reference picture information decoding unit identifies the header of a unit of pictures (SPS), using information identifying the header of a unit of pictures (SPS) included in the identified header of the picture unit (PPS). Lastly, the first reference picture information decoding unit obtains the first reference picture information from the identified header of a unit of pictures (SPS). It should be noted that a method of obtaining the first reference picture information is not limited to the aforementioned method. The first reference picture information may be obtained from the header of a unit of one or more pictures included in the coded signal (for example, SPS or PPS).

Here, the first reference picture information is, for example, a reference picture set which includes the difference information of the POC. In other words, the first reference picture information is information which indicates a difference in display order between each of the one or more first reference pictures and the current picture.

Next, the determination unit determines whether or not the second reference picture which is one of the one or more first reference pictures identified by the first reference picture information is stored in a buffer (DBP) (Step S32). For example, the determination unit identifies the second reference picture which is one of the one or more first reference pictures, using the first reference picture information. For example, the determination unit derives the POC of the second reference picture from the difference information of the POC of the second reference picture. Next, the determination unit determines whether or not the picture corresponding to the derived POC is stored in the buffer.

When the second reference picture is not stored in the buffer (No in Step S32), the third reference picture determination unit determines, as the third reference picture (alternative reference picture), a picture which is stored in the buffer and is different from the second reference picture (Step S33).

Specifically, the third reference picture determination unit determines, as the third reference picture, a picture which is the closest in display order to the second reference picture among the pictures stored in the buffer. Moreover, when there are a plurality of pictures which are the closest in display order to the second reference picture, the third reference picture determination unit determines, as the third reference picture, a picture which is the closest in display order to the current picture among the pictures.

Moreover, the third reference picture determination unit determines, as the third reference picture, a picture which is the closest in decoding order to the second reference picture among the pictures stored in the buffer. Moreover, when there are a plurality of pictures which are the closest in decoding order to the second reference picture, the third reference picture determination unit determines, as the third reference picture, a picture which is the closest in decoding order to the current picture among the pictures.

Next, the second reference picture information generation unit generates the second reference picture information used in common in the picture (Step S34). In other words, the second reference picture information is used in common in blocks which are included in one or more pictures. In other words, the second reference picture information is generated per a unit of one or more pictures. Here, the second reference picture information is information for identifying the reference picture which can be referred by the current picture and is stored in the buffer. Moreover, the second picture information is information for identifying one or more fourth reference pictures obtained by replacing the second reference picture with the third reference picture, among one or more first reference pictures identified by the first reference picture information.

For example, the second reference picture information is a reference picture set or a reference picture list. Moreover, the reference picture list indicates a correspondence relationship between (i) the reference index which is included in the coded signal and indicates the reference picture to be used and (ii) a reference picture stored in the buffer.

Specifically, the second reference picture information generation unit replaces the reference picture set of the second reference picture with the reference picture set of the third reference picture. Moreover, the second reference picture information generation unit generates the reference picture list using the replaced reference picture set. It should be noted that the second reference picture information generation unit may replace the second reference picture with the third reference picture in the reference picture list instead of replacing the reference picture set. At any rate, the second reference picture is replaced with the third reference picture in the second reference picture information.

Lastly, the current picture decoding unit decodes the current picture from the coded signal, using the fifth reference picture selected from the one or more fourth reference pictures which include the third reference picture instead of the second reference picture (Step S36). Specifically, the current picture decoding unit selects the fifth reference picture from among the one or more fourth reference pictures, using the second reference picture information. More specifically, the current picture decoding unit identifies the reference picture stored in the buffer (DPB) using the second reference picture information (reference picture list), and performs inter-picture prediction using the reference picture. More specifically, the second reference picture information indicates a correspondence relationship between the reference index and the picture stored in the buffer (DPB). The current picture decoding unit uses, as the reference picture of the current block, a picture which corresponds to the reference index provided with the current lock (PU), by referring to the second reference picture information.

Meanwhile, when the second reference picture is stored in the buffer (Yes n Step S32), the second reference picture information generation unit does not replace the reference picture and generates the second reference picture information which is information for identifying the reference information which is used in one or more pictures and is stored in the buffer which can be referred by the current picture (Step S35). In other words, the second reference picture information in this case is information for identifying one or more first reference pictures identified by the first reference picture information. For example, the second reference picture information generation unit generates the second reference picture information (reference picture list) using the first reference picture information (reference picture set).

It should be noted that the header decoder 103 illustrated in FIG. 3 is an example of the first reference picture information decoding unit, the determination unit, the third reference picture determination unit, and the second reference picture information generation unit. The data decoder 104 is an example of the current picture decoding unit.

Although only some exemplary embodiments of the image decoding apparatus have been described above, the scope of the present disclosure is not limited to these embodiments.

Moreover, the processing units included in the image decoding apparatus according to these embodiments are typically realized as LSI that is an integrated circuit. These may be made as separate individual chips, or as a single chip to include a part or all thereof.

Furthermore, the means for circuit integration is not limited to an LSI, and implementation with a dedicated circuit or a general-purpose processor is also available. In addition, it is also acceptable to use a Field Programmable Gate Array (FPGA) that is programmable after the LSI has been manufactured, and a reconfigurable processor in which connections and settings of circuit cells within the LSI are reconfigurable.

Each of the structural elements in each of the above-described embodiments may be configured in the form of an exclusive hardware product, or may be realized by executing a software program suitable for the structural element. Each of the structural elements may be realized by means of a program executing unit, such as a CPU and a processor, reading and executing the software program recorded on a recording medium such as a hard disk or a semiconductor memory.

In other words, the image decoding apparatus includes processing circuitry and storage which is electrically connected to the processing circuitry (accessible from the processing circuitry). The processing circuitry includes at lease one of the dedicated hardware and the program executing unit. Moreover, the storage stores, when the processing circuitry includes the program executing unit, a software program to be executed by the program executing unit. The processing circuitry performs the image decoding method according to the aforementioned embodiments, using the storage.

Furthermore, the present disclosure may be the aforementioned software program, and a non-transitory computer-readable recording medium having the program recorded thereon. Moreover, it goes without saying that the aforementioned program can be distributed via a transmission medium such as the Internet.

Moreover, the figures used above are exemplary to describe in detail the present disclosure, and are not limited to the present disclosure.

Moreover, the division of the functional block in the block diagram is an example, and one of the functional blocks may be realized as one functional block, and a part of the functions may be transferred to another functional block. Moreover, one hardware or software item may perform parallel or time-division process on the functions of the functional blocks having similar functions.

Moreover, the order of steps included in the aforementioned image decoding method is exemplified to describe in detail the present disclosure, and the order other than the aforementioned order is acceptable. Moreover, a part of the aforementioned steps may be performed simultaneously with the other step (in parallel).

Although only some exemplary embodiments have been described above, the scope of the Claims of the present application is not limited to these embodiments. Those skilled in the art will readily appreciate that various modifications may be made in these exemplary embodiments and that other embodiments may be obtained by arbitrarily combining the structural elements of the embodiments without materially departing from the novel teachings and advantages of the subject matter recited in the appended Claims. Accordingly, all such modifications and other embodiments are included in the present disclosure.

Embodiment 2

The processing described in each of embodiments can be simply implemented in an independent computer system, by recording, in a recording medium, one or more programs for implementing the configurations of the moving picture encoding method (image encoding method) and the moving picture decoding method (image decoding method) described in each of embodiments. The recording media may be any recording media as long as the program can be recorded, such as a magnetic disk, an optical disk, a magnetic optical disk, an IC card, and a semiconductor memory.

Hereinafter, the applications to the moving picture encoding method (image encoding method) and the moving picture decoding method (image decoding method) described in each of embodiments and systems using thereof will be described. The system has a feature of having an image coding apparatus that includes an image encoding apparatus using the image encoding method and an image decoding apparatus using the image decoding method. Other configurations in the system can be changed as appropriate depending on the cases.

FIG. 10 illustrates an overall configuration of a content providing system ex100 for implementing content distribution services. The area for providing communication services is divided into cells of desired size, and base stations ex106, ex107, ex108, ex109, and ex110 which are fixed wireless stations are placed in each of the cells.

The content providing system ex100 is connected to devices, such as a computer ex111, a personal digital assistant (PDA) ex112, a camera ex113, a cellular phone ex114 and a game machine ex115, via the Internet ex101, an Internet service provider ex102, a telephone network ex104, as well as the base stations ex106 to ex110, respectively.

However, the configuration of the content providing system ex100 is not limited to the configuration shown in FIG. 10, and a combination in which any of the elements are connected is acceptable. In addition, each device may be directly connected to the telephone network ex104, rather than via the base stations ex106 to ex110 which are the fixed wireless stations. Furthermore, the devices may be interconnected to each other via a short distance wireless communication and others.

The camera ex113, such as a digital video camera, is capable of capturing video. A camera ex116, such as a digital camera, is capable of capturing both still images and video. Furthermore, the cellular phone ex114 may be the one that meets any of the standards such as Global System for Mobile Communications (GSM) (registered trademark), Code Division Multiple Access (CDMA), Wideband-Code Division Multiple Access (W-CDMA), Long Term Evolution (LTE), and High Speed Packet Access (HSPA). Alternatively, the cellular phone ex114 may be a Personal Handyphone System (PHS).

In the content providing system ex100, a streaming server ex103 is connected to the camera ex113 and others via the telephone network ex104 and the base station ex109, which enables distribution of images of a live show and others. In such a distribution, a content (for example, video of a music live show) captured by the user using the camera ex113 is encoded as described above in each of embodiments (i.e., the camera functions as the image encoding apparatus according to an aspect of the present disclosure), and the encoded content is transmitted to the streaming server ex103. On the other hand, the streaming server ex103 carries out stream distribution of the transmitted content data to the clients upon their requests. The clients include the computer ex111, the PDA ex112, the camera ex113, the cellular phone ex114, and the game machine ex115 that are capable of decoding the above-mentioned encoded data. Each of the devices that have received the distributed data decodes and reproduces the encoded data (i.e., functions as the image decoding apparatus according to an aspect of the present disclosure).

The captured data may be encoded by the camera ex113 or the streaming server ex103 that transmits the data, or the encoding processes may be shared between the camera ex113 and the streaming server ex103. Similarly, the distributed data may be decoded by the clients or the streaming server ex103, or the decoding processes may be shared between the clients and the streaming server ex103. Furthermore, the data of the still images and video captured by not only the camera ex113 but also the camera ex116 may be transmitted to the streaming server ex103 through the computer ex111. The encoding processes may be performed by the camera ex116, the computer ex111, or the streaming server ex103, or shared among them.

Furthermore, the coding processes may be performed by an LSI ex500 generally included in each of the computer ex111 and the devices. The LSI ex500 may be configured of a single chip or a plurality of chips. Software for coding video may be integrated into some type of a recording medium (such as a CD-ROM, a flexible disk, and a hard disk) that is readable by the computer ex111 and others, and the coding processes may be performed using the software. Furthermore, when the cellular phone ex114 is equipped with a camera, the video data obtained by the camera may be transmitted. The video data is data encoded by the LSI ex500 included in the cellular phone ex114.

Furthermore, the streaming server ex103 may be composed of servers and computers, and may decentralize data and process the decentralized data, record, or distribute data.

As described above, the clients may receive and reproduce the encoded data in the content providing system ex100. In other words, the clients can receive and decode information transmitted by the user, and reproduce the decoded data in real time in the content providing system ex100, so that the user who does not have any particular right and equipment can implement personal broadcasting.

Figure 11:
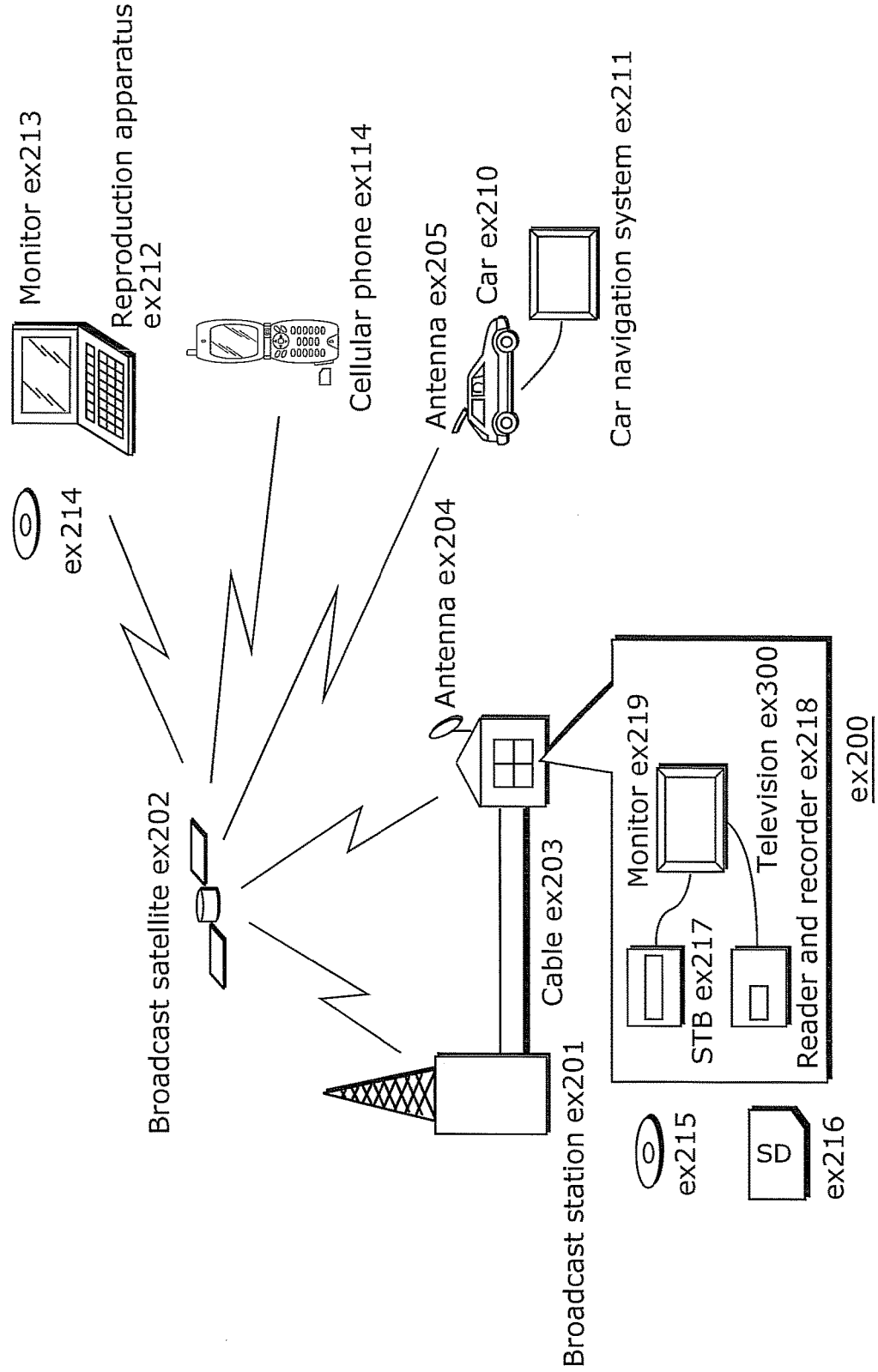
FIG. 11 shows an overall configuration of a digital broadcasting system.

Aside from the example of the content providing system ex100, at least one of the moving picture coding apparatus (image coding apparatus) described in each of embodiments may be implemented in a digital broadcasting system ex200 illustrated in FIG. 11. More specifically, a broadcast station ex201 communicates or transmits, via radio waves to a broadcast satellite ex202, multiplexed data obtained by multiplexing audio data and others onto video data. The video data is data encoded by the moving picture encoding method described in each of embodiments (i.e., data encoded by the image encoding apparatus according to an aspect of the present disclosure). Upon receipt of the multiplexed data, the broadcast satellite ex202 transmits radio waves for broadcasting. Then, a home-use antenna ex204 with a satellite broadcast reception function receives the radio waves. Next, a device such as a television (receiver) ex300 and a set top box (STB) ex217 decodes the received multiplexed data, and reproduces the decoded data (i.e., functions as the image decoding apparatus according to an aspect of the present disclosure).

Furthermore, a reader/recorder ex218 (i) reads and decodes the multiplexed data recorded on a recording medium ex215, such as a DVD and a BD, or (i) encodes video signals in the recording medium ex215, and in some cases, writes data obtained by multiplexing an audio signal on the encoded data. The reader/recorder ex218 can include the moving picture decoding apparatus or the moving picture encoding apparatus as shown in each of embodiments. In this case, the reproduced video signals are displayed on the monitor ex219, and can be reproduced by another device or system using the recording medium ex215 on which the multiplexed data is recorded. It is also possible to implement the moving picture decoding apparatus in the set top box ex217 connected to the cable ex203 for a cable television or to the antenna ex204 for satellite and/or terrestrial broadcasting, so as to display the video signals on the monitor ex219 of the television ex300. The moving picture decoding apparatus may be implemented not in the set top box but in the television ex300.

Figure 12:
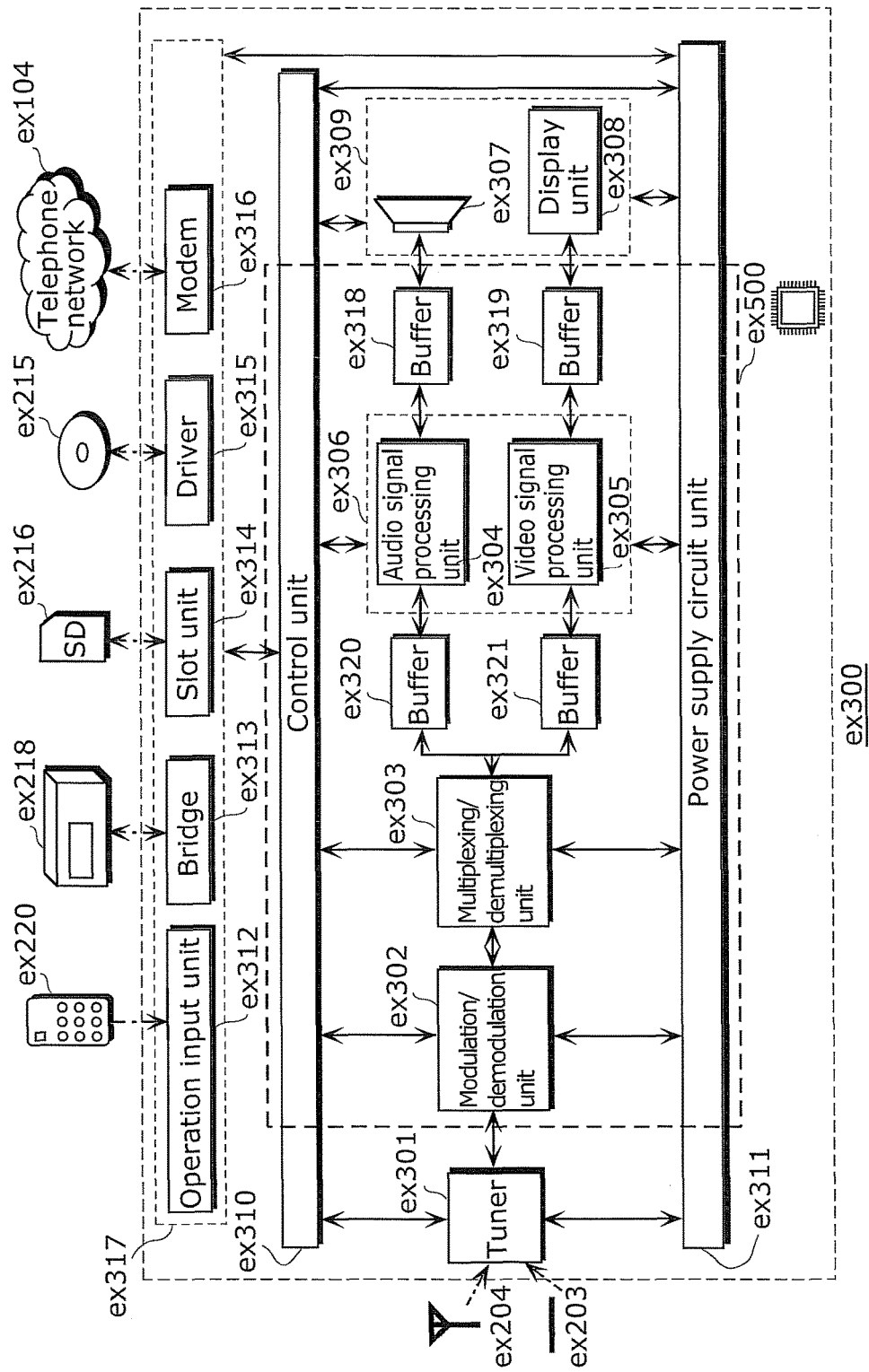
FIG. 12 shows a block diagram illustrating an example of a configuration of a television.

FIG. 12 illustrates the television (receiver) ex300 that uses the moving picture encoding method and the moving picture decoding method described in each of embodiments. The television ex300 includes: a tuner ex301 that obtains or provides multiplexed data obtained by multiplexing audio data onto video data, through the antenna ex204 or the cable ex203, etc. that receives a broadcast; a modulation/demodulation unit ex302 that demodulates the received multiplexed data or modulates data into multiplexed data to be supplied outside; and a multiplexing/demultiplexing unit ex303 that demultiplexes the modulated multiplexed data into video data and audio data, or multiplexes video data and audio data encoded by a signal processing unit ex306 into data.

The television ex300 further includes: a signal processing unit ex306 including an audio signal processing unit ex304 and a video signal processing unit ex305 that code each of audio data and video data, (which function as the image coding apparatus according to the aspects of the present disclosure); and an output unit ex309 including a speaker ex307 that provides the decoded audio signal, and a display unit ex308 that displays the decoded video signal, such as a display. Furthermore, the television ex300 includes an interface unit ex317 including an operation input unit ex312 that receives an input of a user operation. Furthermore, the television ex300 includes a control unit ex310 that controls overall each constituent element of the television ex300, and a power supply circuit unit ex311 that supplies power to each of the elements. Other than the operation input unit ex312, the interface unit ex317 may include: a bridge ex313 that is connected to an external device, such as the reader/recorder ex218; a slot unit ex314 for enabling attachment of the recording medium ex216, such as an SD card; a driver ex315 to be connected to an external recording medium, such as a hard disk; and a modem ex316 to be connected to a telephone network. Here, the recording medium ex216 can electrically record information using a non-volatile/volatile semiconductor memory element for storage. The constituent elements of the television ex300 are connected to each other through a synchronous bus.

First, the configuration in which the television ex300 decodes multiplexed data obtained from outside through the antenna ex204 and others and reproduces the decoded data will be described. In the television ex300, upon a user operation through a remote controller ex220 and others, the multiplexing/demultiplexing unit ex303 demultiplexes the multiplexed data demodulated by the modulation/demodulation unit ex302, under control of the control unit ex310 including a CPU. Furthermore, the audio signal processing unit ex304 decodes the demultiplexed audio data, and the video signal processing unit ex305 decodes the demultiplexed video data, using the decoding method described in each of embodiments, in the television ex300. The output unit ex309 provides the decoded video signal and audio signal outside, respectively. When the output unit ex309 provides the video signal and the audio signal, the signals may be temporarily stored in buffers ex318 and ex319, and others so that the signals are reproduced in synchronization with each other. Furthermore, the television ex300 may read multiplexed data not through a broadcast and others but from the recording media ex215 and ex216, such as a magnetic disk, an optical disk, and a SD card. Next, a configuration in which the television ex300 encodes an audio signal and a video signal, and transmits the data outside or writes the data on a recording medium will be described. In the television ex300, upon a user operation through the remote controller ex220 and others, the audio signal processing unit ex304 encodes an audio signal, and the video signal processing unit ex305 encodes a video signal, under control of the control unit ex310 using the encoding method described in each of embodiments. The multiplexing/demultiplexing unit ex303 multiplexes the encoded video signal and audio signal, and provides the resulting signal outside. When the multiplexing/demultiplexing unit ex303 multiplexes the video signal and the audio signal, the signals may be temporarily stored in the buffers ex320 and ex321, and others so that the signals are reproduced in synchronization with each other. Here, the buffers ex318, ex319, ex320, and ex321 may be plural as illustrated, or at least one buffer may be shared in the television ex300. Furthermore, data may be stored in a buffer so that the system overflow and underflow may be avoided between the modulation/demodulation unit ex302 and the multiplexing/demultiplexing unit ex303, for example.

Furthermore, the television ex300 may include a configuration for receiving an AV input from a microphone or a camera other than the configuration for obtaining audio and video data from a broadcast or a recording medium, and may encode the obtained data. Although the television ex300 can encode, multiplex, and provide outside data in the description, it may be capable of only receiving, decoding, and providing outside data but not the encoding, multiplexing, and providing outside data.

Furthermore, when the reader/recorder ex218 reads or writes multiplexed data from or on a recording medium, one of the television ex300 and the reader/recorder ex218 may code the multiplexed data, and the television ex300 and the reader/recorder ex218 may share the coding partly.

Figure 13:
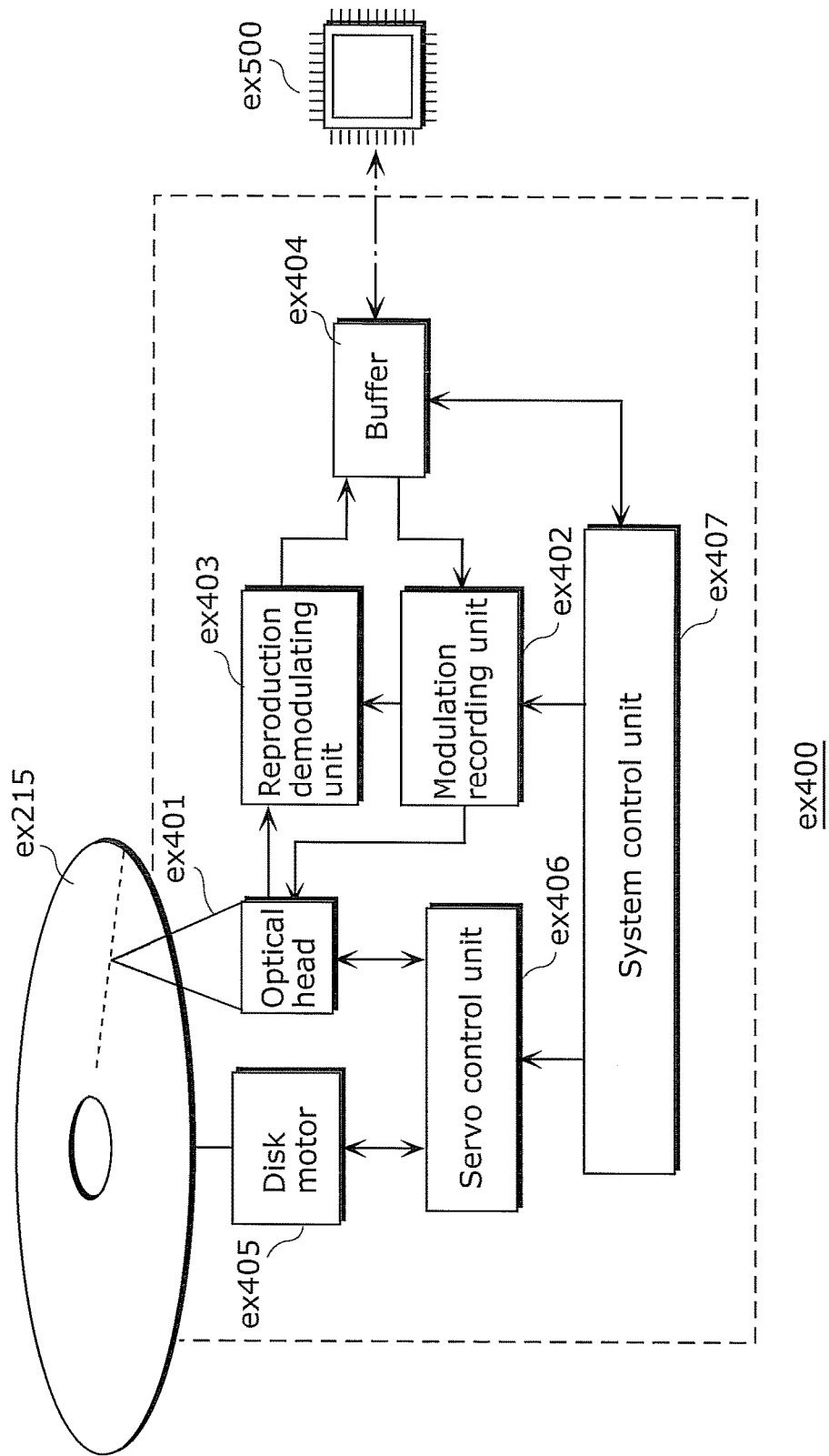
FIG. 13 shows a block diagram illustrating an example of a configuration of an information reproducing/recording unit that reads and writes information from and on a recording medium that is an optical disk.

As an example, FIG. 13 illustrates a configuration of an information reproducing/recording unit ex400 when data is read or written from or on an optical disk. The information reproducing/recording unit ex400 includes constituent elements ex401, ex402, ex403, ex404, ex405, ex406, and ex407 to be described hereinafter. The optical head ex401 irradiates a laser spot in a recording surface of the recording medium ex215 that is an optical disk to write information, and detects reflected light from the recording surface of the recording medium ex215 to read the information. The modulation recording unit ex402 electrically drives a semiconductor laser included in the optical head ex401, and modulates the laser light according to recorded data. The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information. The buffer ex404 temporarily holds the information to be recorded on the recording medium ex215 and the information reproduced from the recording medium ex215. The disk motor ex405 rotates the recording medium ex215. The servo control unit ex406 moves the optical head ex401 to a predetermined information track while controlling the rotation drive of the disk motor ex405 so as to follow the laser spot. The system control unit ex407 controls overall the information reproducing/recording unit ex400. The reading and writing processes can be implemented by the system control unit ex407 using various information stored in the buffer ex404 and generating and adding new information as necessary, and by the modulation recording unit ex402, the reproduction demodulating unit ex403, and the servo control unit ex406 that record and reproduce information through the optical head ex401 while being operated in a coordinated manner. The system control unit ex407 includes, for example, a microprocessor, and executes processing by causing a computer to execute a program for read and write.

Although the optical head ex401 irradiates a laser spot in the description, it may perform high-density recording using near field light.

Figure 14:
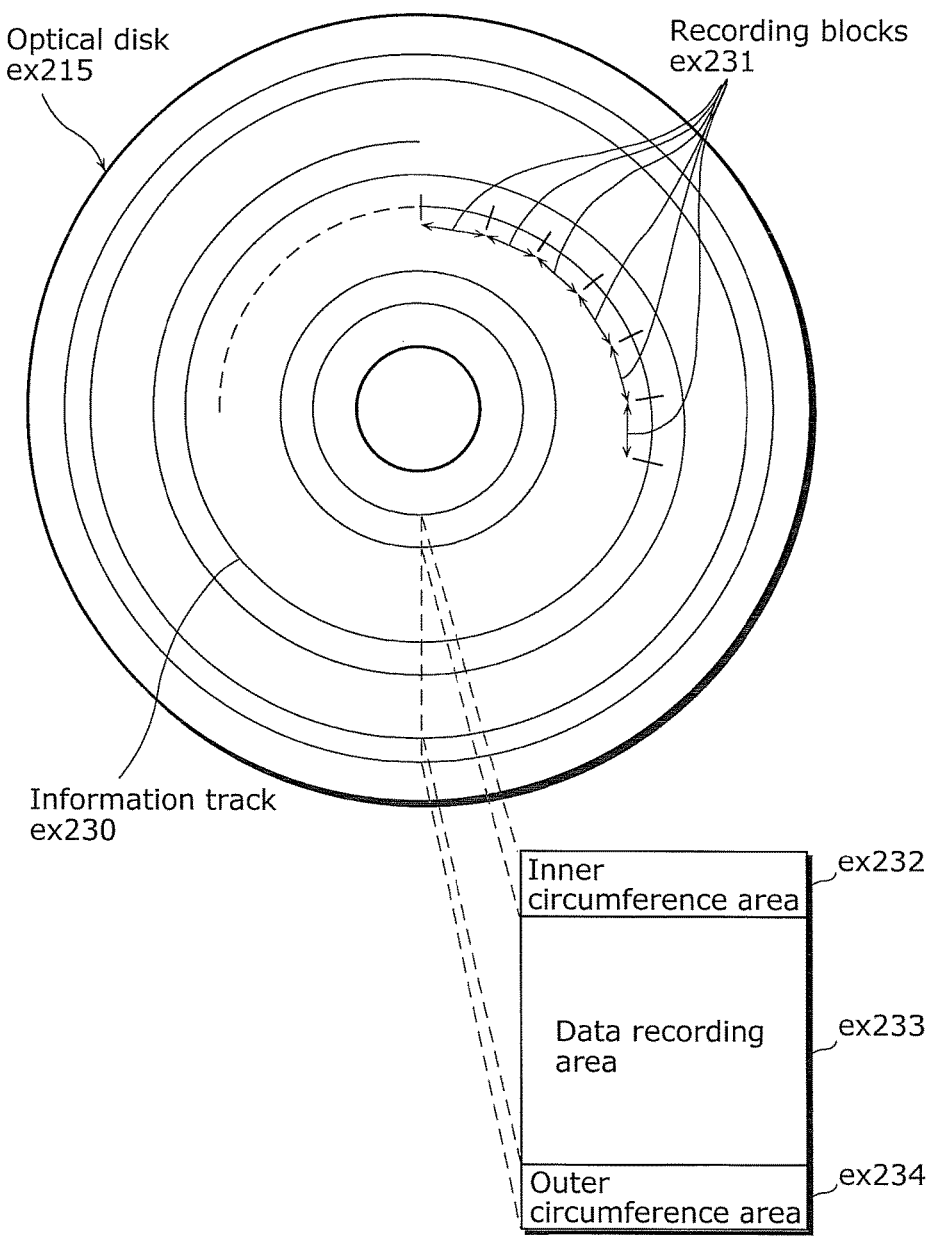
FIG. 14 shows an example of a configuration of a recording medium that is an optical disk.

FIG. 14 illustrates the recording medium ex215 that is the optical disk. On the recording surface of the recording medium ex215, guide grooves are spirally formed, and an information track ex230 records, in advance, address information indicating an absolute position on the disk according to change in a shape of the guide grooves. The address information includes information for determining positions of recording blocks ex231 that are a unit for recording data. Reproducing the information track ex230 and reading the address information in an apparatus that records and reproduces data can lead to determination of the positions of the recording blocks. Furthermore, the recording medium ex215 includes a data recording area ex233, an inner circumference area ex232, and an outer circumference area ex234. The data recording area ex233 is an area for use in recording the user data. The inner circumference area ex232 and the outer circumference area ex234 that are inside and outside of the data recording area ex233, respectively are for specific use except for recording the user data. The information reproducing/recording unit 400 reads and writes encoded audio, encoded video data, or multiplexed data obtained by multiplexing the encoded audio and video data, from and on the data recording area ex233 of the recording medium ex215.

Although an optical disk having a layer, such as a DVD and a BD is described as an example in the description, the optical disk is not limited to such, and may be an optical disk having a multilayer structure and capable of being recorded on a part other than the surface. Furthermore, the optical disk may have a structure for multidimensional recording/reproduction, such as recording of information using light of colors with different wavelengths in the same portion of the optical disk and for recording information having different layers from various angles.

Furthermore, a car ex210 having an antenna ex205 can receive data from the satellite ex202 and others, and reproduce video on a display device such as a car navigation system ex211 set in the car ex210, in the digital broadcasting system ex200. Here, a configuration of the car navigation system ex211 will be a configuration, for example, including a GPS receiving unit from the configuration illustrated in FIG. 12. The same will be true for the configuration of the computer ex111, the cellular phone ex114, and others.

Figure 15A:
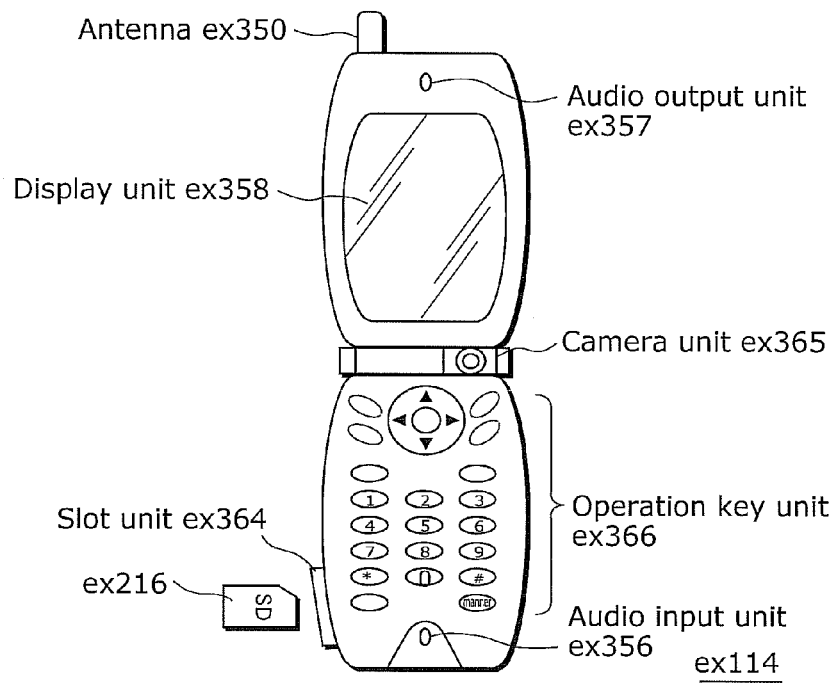
FIG. 15A shows an example of a cellular phone.

FIG. 15A illustrates the cellular phone ex114 that uses the moving picture coding method described in embodiments. The cellular phone ex114 includes: an antenna ex350 for transmitting and receiving radio waves through the base station ex110; a camera unit ex365 capable of capturing moving and still images; and a display unit ex358 such as a liquid crystal display for displaying the data such as decoded video captured by the camera unit ex365 or received by the antenna ex350. The cellular phone ex114 further includes: a main body unit including an operation key unit ex366; an audio output unit ex357 such as a speaker for output of audio; an audio input unit ex356 such as a microphone for input of audio; a memory unit ex367 for storing captured video or still pictures, recorded audio, coded data of the received video, the still pictures, e-mails, or others; and a slot unit ex364 that is an interface unit for a recording medium that stores data in the same manner as the memory unit ex367.

Figure 15B:
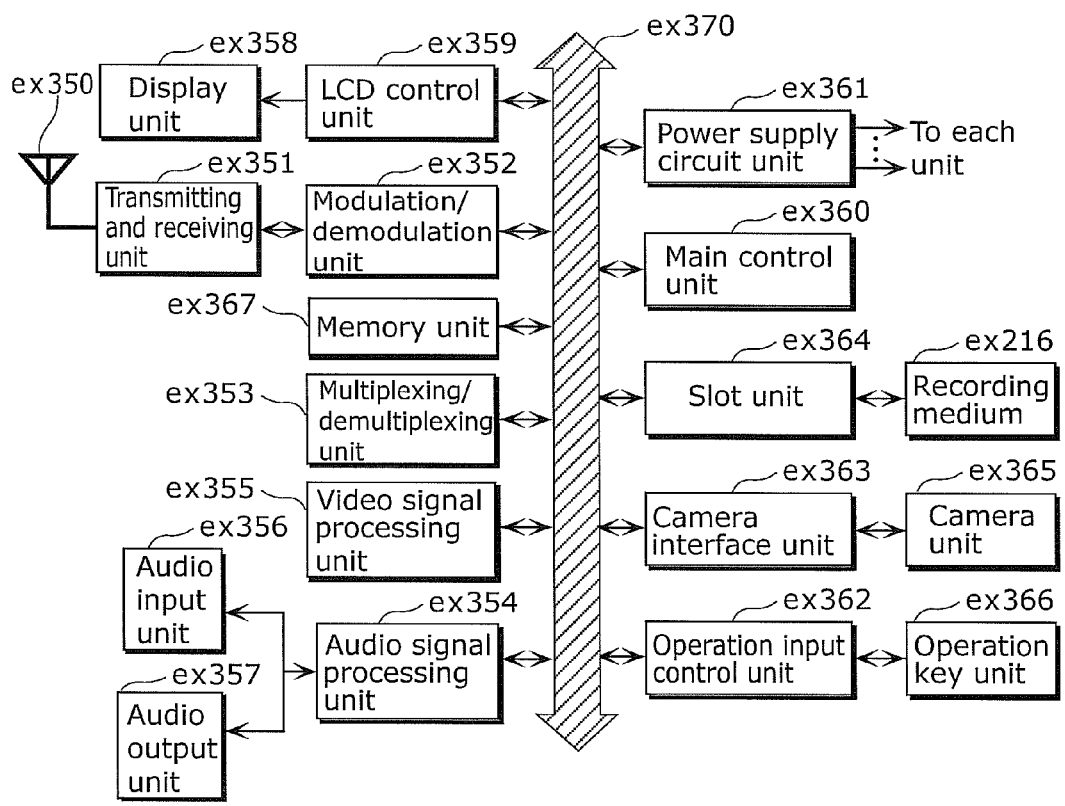
FIG. 15B is a block diagram showing an example of a configuration of a cellular phone.

Next, an example of a configuration of the cellular phone ex114 will be described with reference to FIG. 15B. In the cellular phone ex114, a main control unit ex360 designed to control overall each unit of the main body including the display unit ex358 as well as the operation key unit ex366 is connected mutually, via a synchronous bus ex370, to a power supply circuit unit ex361, an operation input control unit ex362, a video signal processing unit ex355, a camera interface unit ex363, a liquid crystal display (LCD) control unit ex359, a modulation/demodulation unit ex352, a multiplexing/demultiplexing unit ex353, an audio signal processing unit ex354, the slot unit ex364, and the memory unit ex367.

When a call-end key or a power key is turned ON by a user's operation, the power supply circuit unit ex361 supplies the respective units with power from a battery pack so as to activate the cell phone ex114.

In the cellular phone ex114, the audio signal processing unit ex354 converts the audio signals collected by the audio input unit ex356 in voice conversation mode into digital audio signals under the control of the main control unit ex360 including a CPU, ROM, and RAM. Then, the modulation/demodulation unit ex352 performs spread spectrum processing on the digital audio signals, and the transmitting and receiving unit ex351 performs digital-to-analog conversion and frequency conversion on the data, so as to transmit the resulting data via the antenna ex350. Also, in the cellular phone ex114, the transmitting and receiving unit ex351 amplifies the data received by the antenna ex350 in voice conversation mode and performs frequency conversion and the analog-to-digital conversion on the data. Then, the modulation/demodulation unit ex352 performs inverse spread spectrum processing on the data, and the audio signal processing unit ex354 converts it into analog audio signals, so as to output them via the audio output unit ex357.

Furthermore, when an e-mail in data communication mode is transmitted, text data of the e-mail inputted by operating the operation key unit ex366 and others of the main body is sent out to the main control unit ex360 via the operation input control unit ex362. The main control unit ex360 causes the modulation/demodulation unit ex352 to perform spread spectrum processing on the text data, and the transmitting and receiving unit ex351 performs the digital-to-analog conversion and the frequency conversion on the resulting data to transmit the data to the base station ex110 via the antenna ex350. When an e-mail is received, processing that is approximately inverse to the processing for transmitting an e-mail is performed on the received data, and the resulting data is provided to the display unit ex358.

When video, still images, or video and audio in data communication mode is or are transmitted, the video signal processing unit ex355 compresses and encodes video signals supplied from the camera unit ex365 using the moving picture encoding method shown in each of embodiments (i.e., functions as the image encoding apparatus according to the aspect of the present disclosure), and transmits the encoded video data to the multiplexing/demultiplexing unit ex353. In contrast, during when the camera unit ex365 captures video, still images, and others, the audio signal processing unit ex354 encodes audio signals collected by the audio input unit ex356, and transmits the encoded audio data to the multiplexing/demultiplexing unit ex353.

The multiplexing/demultiplexing unit ex353 multiplexes the encoded video data supplied from the video signal processing unit ex355 and the encoded audio data supplied from the audio signal processing unit ex354, using a predetermined method. Then, the modulation/demodulation unit (modulation/demodulation circuit unit) ex352 performs spread spectrum processing on the multiplexed data, and the transmitting and receiving unit ex351 performs digital-to-analog conversion and frequency conversion on the data so as to transmit the resulting data via the antenna ex350.

When receiving data of a video file which is linked to a Web page and others in data communication mode or when receiving an e-mail with video and/or audio attached, in order to decode the multiplexed data received via the antenna ex350, the multiplexing/demultiplexing unit ex353 demultiplexes the multiplexed data into a video data bit stream and an audio data bit stream, and supplies the video signal processing unit ex355 with the encoded video data and the audio signal processing unit ex354 with the encoded audio data, through the synchronous bus ex370. The video signal processing unit ex355 decodes the video signal using a moving picture decoding method corresponding to the moving picture encoding method shown in each of embodiments (i.e., functions as the image decoding apparatus according to the aspect of the present disclosure), and then the display unit ex358 displays, for instance, the video and still images included in the video file linked to the Web page via the LCD control unit ex359. Furthermore, the audio signal processing unit ex354 decodes the audio signal, and the audio output unit ex357 provides the audio.

Furthermore, similarly to the television ex300, a terminal such as the cellular phone ex114 probably have 3 types of implementation configurations including not only (i) a transmitting and receiving terminal including both an encoding apparatus and a decoding apparatus, but also (ii) a transmitting terminal including only an encoding apparatus and (iii) a receiving terminal including only a decoding apparatus. Although the digital broadcasting system ex200 receives and transmits the multiplexed data obtained by multiplexing audio data onto video data in the description, the multiplexed data may be data obtained by multiplexing not audio data but character data related to video onto video data, and may be not multiplexed data but video data itself.

As such, the moving picture coding method in each of embodiments can be used in any of the devices and systems described. Thus, the advantages described in each of embodiments can be obtained.

Furthermore, various modifications and revisions can be made in any of the embodiments in the present disclosure.

Embodiment 3

Video data can be generated by switching, as necessary, between (i) the moving picture encoding method or the moving picture encoding apparatus shown in each of embodiments and (ii) a moving picture encoding method or a moving picture encoding apparatus in conformity with a different standard, such as MPEG-2, MPEG-4 AVC, and VC-1.

Here, when a plurality of video data that conforms to the different standards is generated and is then decoded, the decoding methods need to be selected to conform to the different standards. However, since to which standard each of the plurality of the video data to be decoded conform cannot be detected, an appropriate decoding method cannot be selected.

In view of this, multiplexed data obtained by multiplexing audio data and others onto video data has a structure including identification information indicating to which standard the video data conforms. The specific structure of the multiplexed data including the video data generated in the moving picture encoding method and by the moving picture encoding apparatus shown in each of embodiments will be hereinafter described. The multiplexed data is a digital stream in the MPEG-2 Transport Stream format.

FIG. 16 illustrates a structure of the multiplexed data. As illustrated in FIG. 16, the multiplexed data can be obtained by multiplexing at least one of a video stream, an audio stream, a presentation graphics stream (PG), and an interactive graphics stream. The video stream represents primary video and secondary video of a movie, the audio stream (IG) represents a primary audio part and a secondary audio part to be mixed with the primary audio part, and the presentation graphics stream represents subtitles of the movie. Here, the primary video is normal video to be displayed on a screen, and the secondary video is video to be displayed on a smaller window in the primary video. Furthermore, the interactive graphics stream represents an interactive screen to be generated by arranging the GUI components on a screen. The video stream is encoded in the moving picture encoding method or by the moving picture encoding apparatus shown in each of embodiments, or in a moving picture encoding method or by a moving picture encoding apparatus in conformity with a conventional standard, such as MPEG-2, MPEG-4 AVC, and VC-1. The audio stream is encoded in accordance with a standard, such as Dolby-AC-3, Dolby Digital Plus, MLP, DTS, DTS-HD, and linear PCM.

Each stream included in the multiplexed data is identified by PID. For example, 0x1011 is allocated to the video stream to be used for video of a movie, 0x1100 to 0x111F are allocated to the audio streams, 0x1200 to 0x121F are allocated to the presentation graphics streams, 0x1400 to 0x141F are allocated to the interactive graphics streams, 0x1B00 to 0x1B1F are allocated to the video streams to be used for secondary video of the movie, and 0x1A00 to 0x1A1F are allocated to the audio streams to be used for the secondary audio to be mixed with the primary audio.

Figure 17:
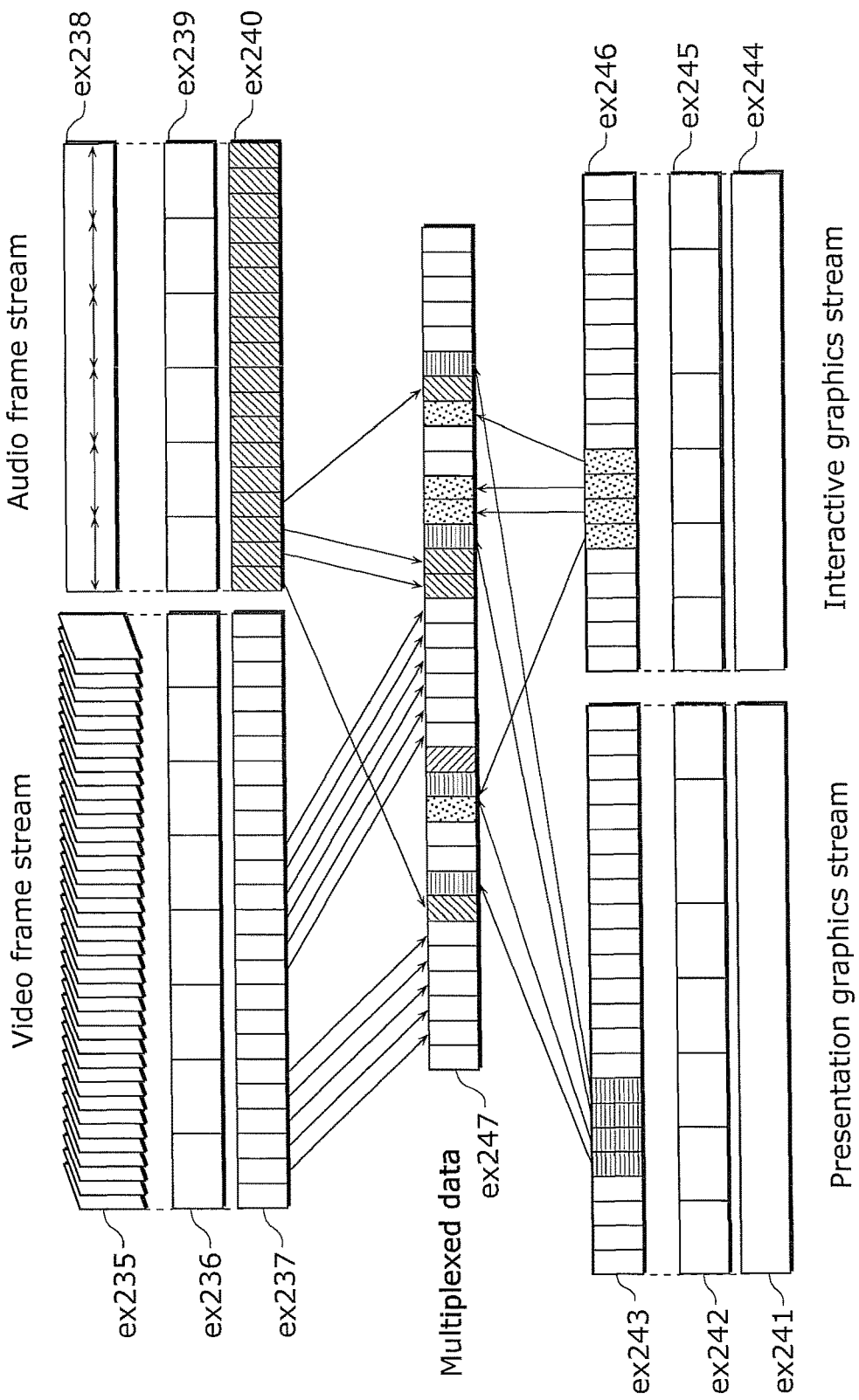
FIG. 17 schematically shows how each stream is multiplexed in multiplexed data.

FIG. 17 schematically illustrates how data is multiplexed. First, a video stream ex235 composed of video frames and an audio stream ex238 composed of audio frames are transformed into a stream of PES packets ex236 and a stream of PES packets ex239, and further into TS packets ex237 and TS packets ex240, respectively. Similarly, data of a presentation graphics stream ex241 and data of an interactive graphics stream ex244 are transformed into a stream of PES packets ex242 and a stream of PES packets ex245, and further into TS packets ex243 and TS packets ex246, respectively. These TS packets are multiplexed into a stream to obtain multiplexed data ex247.

Figure 18:
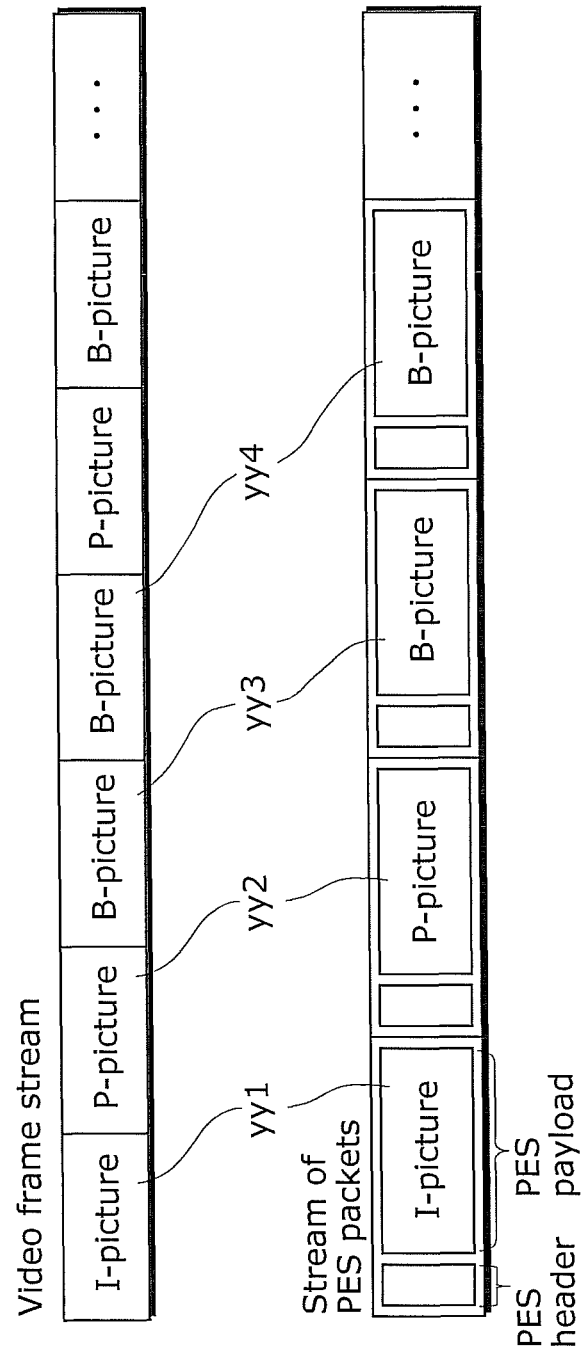
FIG. 18 shows how a video stream is stored in a stream of PES packets in more detail.

FIG. 18 illustrates how a video stream is stored in a stream of PES packets in more detail. The first bar in FIG. 18 shows a video frame stream in a video stream. The second bar shows the stream of PES packets. As indicated by arrows denoted as yy1, yy2, yy3, and yy4 in FIG. 18, the video stream is divided into pictures as I pictures, B pictures, and P pictures each of which is a video presentation unit, and the pictures are stored in a payload of each of the PES packets. Each of the PES packets has a PES header, and the PES header stores a Presentation Time-Stamp (PTS) indicating a display time of the picture, and a Decoding Time-Stamp (DTS) indicating a decoding time of the picture.

FIG. 19 illustrates a format of TS packets to be finally written on the multiplexed data. Each of the TS packets is a 188-byte fixed length packet including a 4-byte TS header having information, such as a PID for identifying a stream and a 184-byte TS payload for storing data. The PES packets are divided, and stored in the TS payloads, respectively. When a BD ROM is used, each of the TS packets is given a 4-byte TP_Extra_Header, thus resulting in 192-byte source packets. The source packets are written on the multiplexed data. The TP_Extra_Header stores information such as an Arrival_Time_Stamp (ATS). The ATS shows a transfer start time at which each of the TS packets is to be transferred to a PID filter. The source packets are arranged in the multiplexed data as shown at the bottom of FIG. 19. The numbers incrementing from the head of the multiplexed data are called source packet numbers (SPNs).

Each of the TS packets included in the multiplexed data includes not only streams of audio, video, subtitles and others, but also a Program Association Table (PAT), a Program Map Table (PMT), and a Program Clock Reference (PCR). The PAT shows what a PID in a PMT used in the multiplexed data indicates, and a PID of the PAT itself is registered as zero. The PMT stores PIDs of the streams of video, audio, subtitles and others included in the multiplexed data, and attribute information of the streams corresponding to the PIDs. The PMT also has various descriptors relating to the multiplexed data. The descriptors have information such as copy control information showing whether copying of the multiplexed data is permitted or not. The PCR stores STC time information corresponding to an ATS showing when the PCR packet is transferred to a decoder, in order to achieve synchronization between an Arrival Time Clock (ATC) that is a time axis of ATSs, and an System Time Clock (STC) that is a time axis of PTSs and DTSs.

Figure 20:
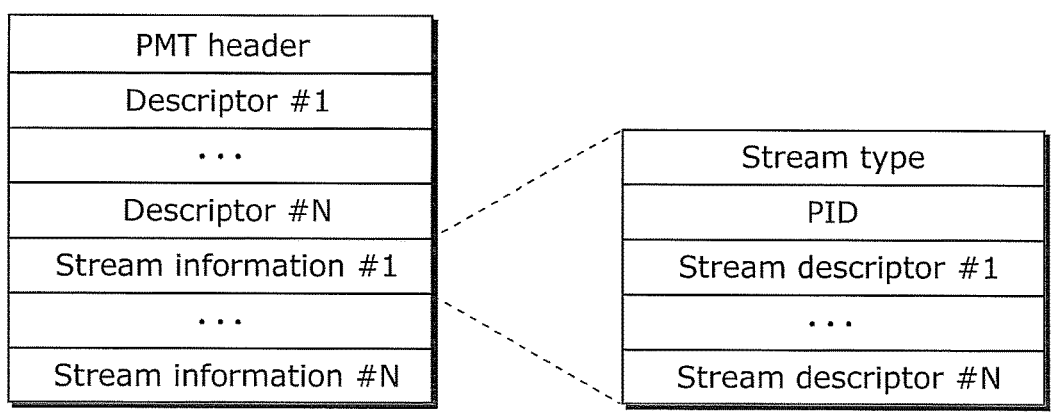
FIG. 20 shows a data structure of a PMT.

FIG. 20 illustrates the data structure of the PMT in detail. A PMT header is disposed at the top of the PMT. The PMT header describes the length of data included in the PMT and others. A plurality of descriptors relating to the multiplexed data is disposed after the PMT header. Information such as the copy control information is described in the descriptors. After the descriptors, a plurality of pieces of stream information relating to the streams included in the multiplexed data is disposed. Each piece of stream information includes stream descriptors each describing information, such as a stream type for identifying a compression codec of a stream, a stream PID, and stream attribute information (such as a frame rate or an aspect ratio). The stream descriptors are equal in number to the number of streams in the multiplexed data.

When the multiplexed data is recorded on a recording medium and others, it is recorded together with multiplexed data information files.

Figure 21:
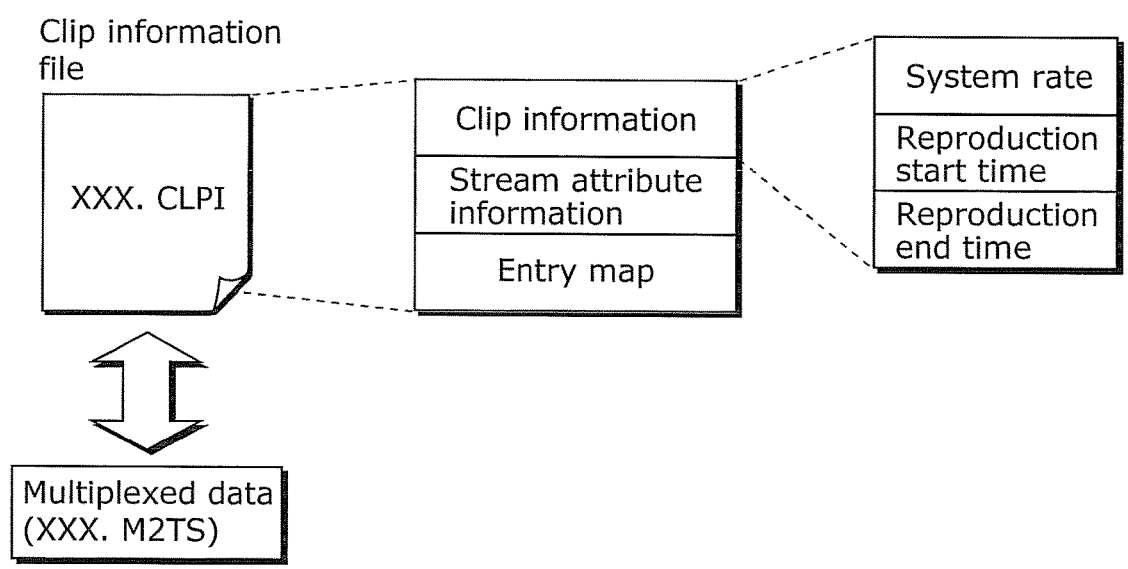
FIG. 21 shows an internal structure of multiplexed data information.

Each of the multiplexed data information files is management information of the multiplexed data as shown in FIG. 21. The multiplexed data information files are in one to one correspondence with the multiplexed data, and each of the files includes multiplexed data information, stream attribute information, and an entry map.

As illustrated in FIG. 21, the multiplexed data information includes a system rate, a reproduction start time, and a reproduction end time. The system rate indicates the maximum transfer rate at which a system target decoder to be described later transfers the multiplexed data to a PID filter. The intervals of the ATSs included in the multiplexed data are set to not higher than a system rate. The reproduction start time indicates a PTS in a video frame at the head of the multiplexed data. An interval of one frame is added to a PTS in a video frame at the end of the multiplexed data, and the PTS is set to the reproduction end time.

Figure 22:
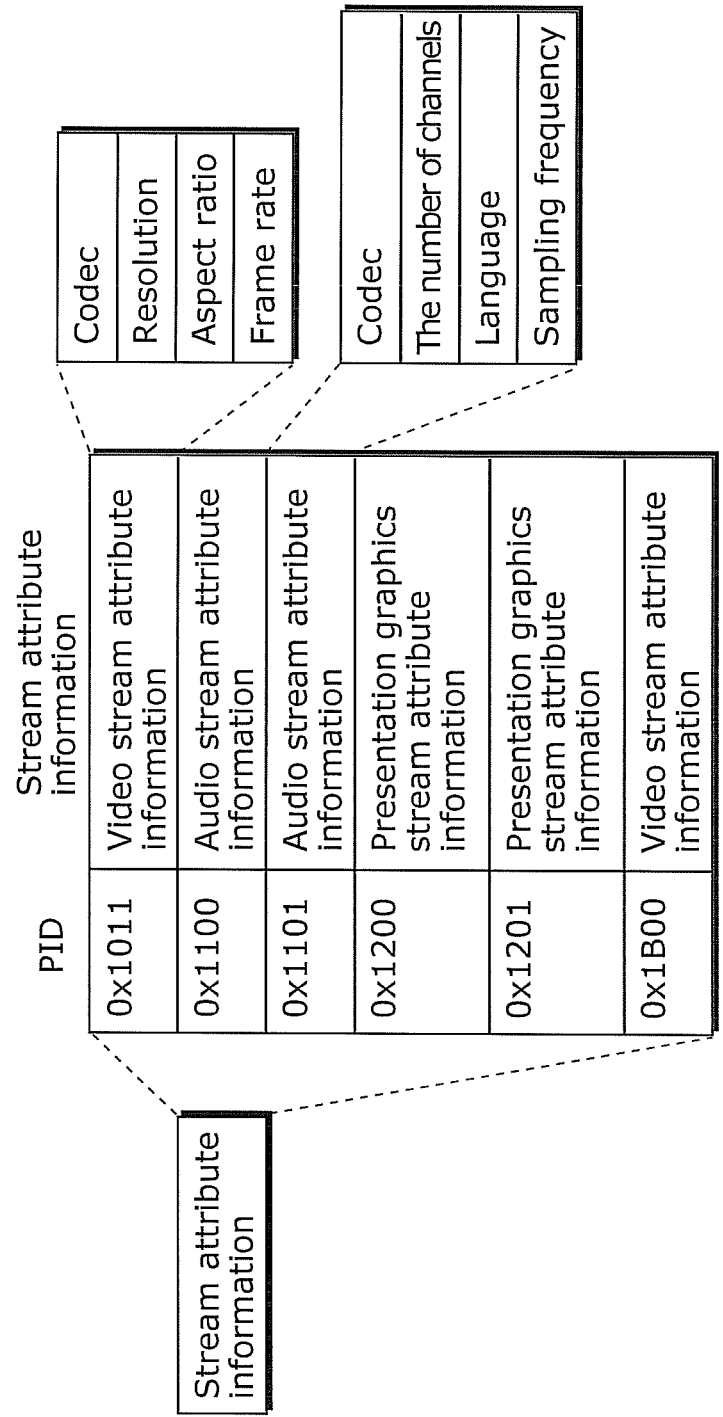
FIG. 22 shows an internal structure of stream attribute information.

As shown in FIG. 22, a piece of attribute information is registered in the stream attribute information, for each PID of each stream included in the multiplexed data. Each piece of attribute information has different information depending on whether the corresponding stream is a video stream, an audio stream, a presentation graphics stream, or an interactive graphics stream. Each piece of video stream attribute information carries information including what kind of compression codec is used for compressing the video stream, and the resolution, aspect ratio and frame rate of the pieces of picture data that is included in the video stream. Each piece of audio stream attribute information carries information including what kind of compression codec is used for compressing the audio stream, how many channels are included in the audio stream, which language the audio stream supports, and how high the sampling frequency is. The video stream attribute information and the audio stream attribute information are used for initialization of a decoder before the player plays back the information.

In the present embodiment, the multiplexed data to be used is of a stream type included in the PMT. Furthermore, when the multiplexed data is recorded on a recording medium, the video stream attribute information included in the multiplexed data information is used. More specifically, the moving picture encoding method or the moving picture encoding apparatus described in each of embodiments includes a step or a unit for allocating unique information indicating video data generated by the moving picture encoding method or the moving picture encoding apparatus in each of embodiments, to the stream type included in the PMT or the video stream attribute information. With the configuration, the video data generated by the moving picture encoding method or the moving picture encoding apparatus described in each of embodiments can be distinguished from video data that conforms to another standard.

Figure 23:
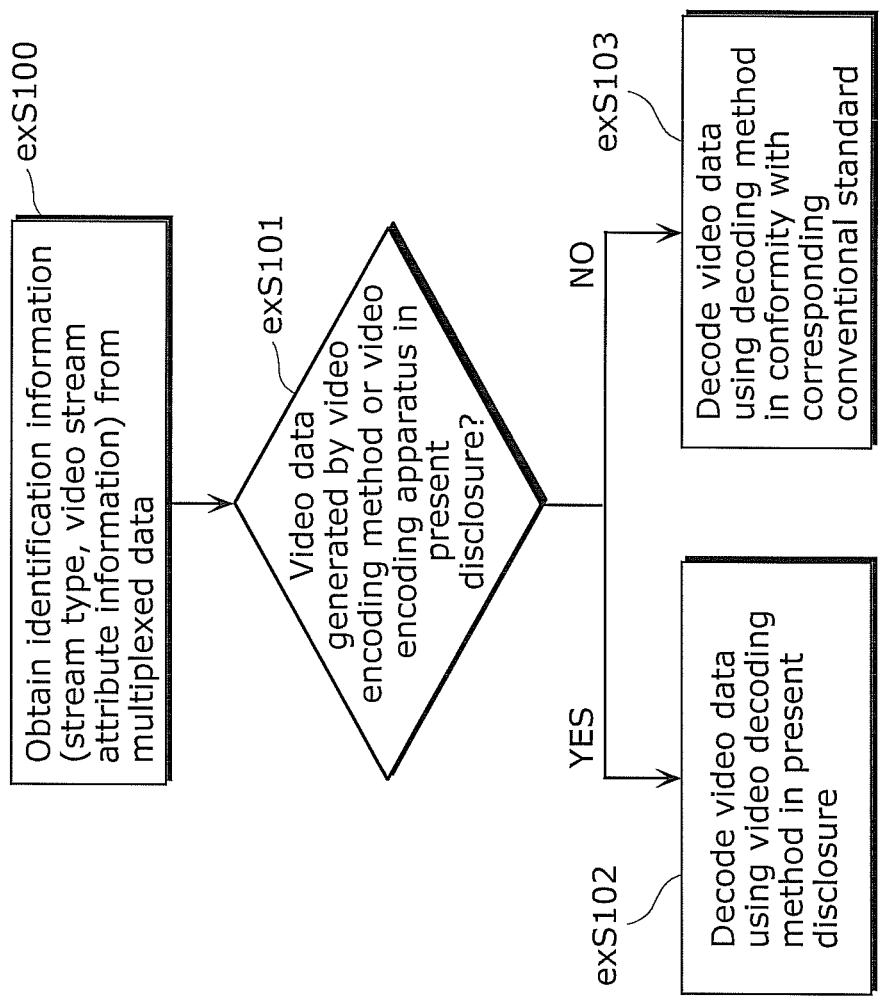
FIG. 23 shows steps for identifying video data.

Furthermore, FIG. 23 illustrates steps of the moving picture decoding method according to the present embodiment. In Step exS100, the stream type included in the PMT or the video stream attribute information included in the multiplexed data information is obtained from the multiplexed data. Next, in Step exS101, it is determined whether or not the stream type or the video stream attribute information indicates that the multiplexed data is generated by the moving picture encoding method or the moving picture encoding apparatus in each of embodiments. When it is determined that the stream type or the video stream attribute information indicates that the multiplexed data is generated by the moving picture encoding method or the moving picture encoding apparatus in each of embodiments, in Step exS102, decoding is performed by the moving picture decoding method in each of embodiments. Furthermore, when the stream type or the video stream attribute information indicates conformance to the conventional standards, such as MPEG-2, MPEG-4 AVC, and VC-1, in Step exS103, decoding is performed by a moving picture decoding method in conformity with the conventional standards.

As such, allocating a new unique value to the stream type or the video stream attribute information enables determination whether or not the moving picture decoding method or the moving picture decoding apparatus that is described in each of embodiments can perform decoding. Even when multiplexed data that conforms to a different standard is input, an appropriate decoding method or apparatus can be selected. Thus, it becomes possible to decode information without any error. Furthermore, the moving picture encoding method or apparatus, or the moving picture decoding method or apparatus in the present embodiment can be used in the devices and systems described above.

Embodiment 4

Figure 24:
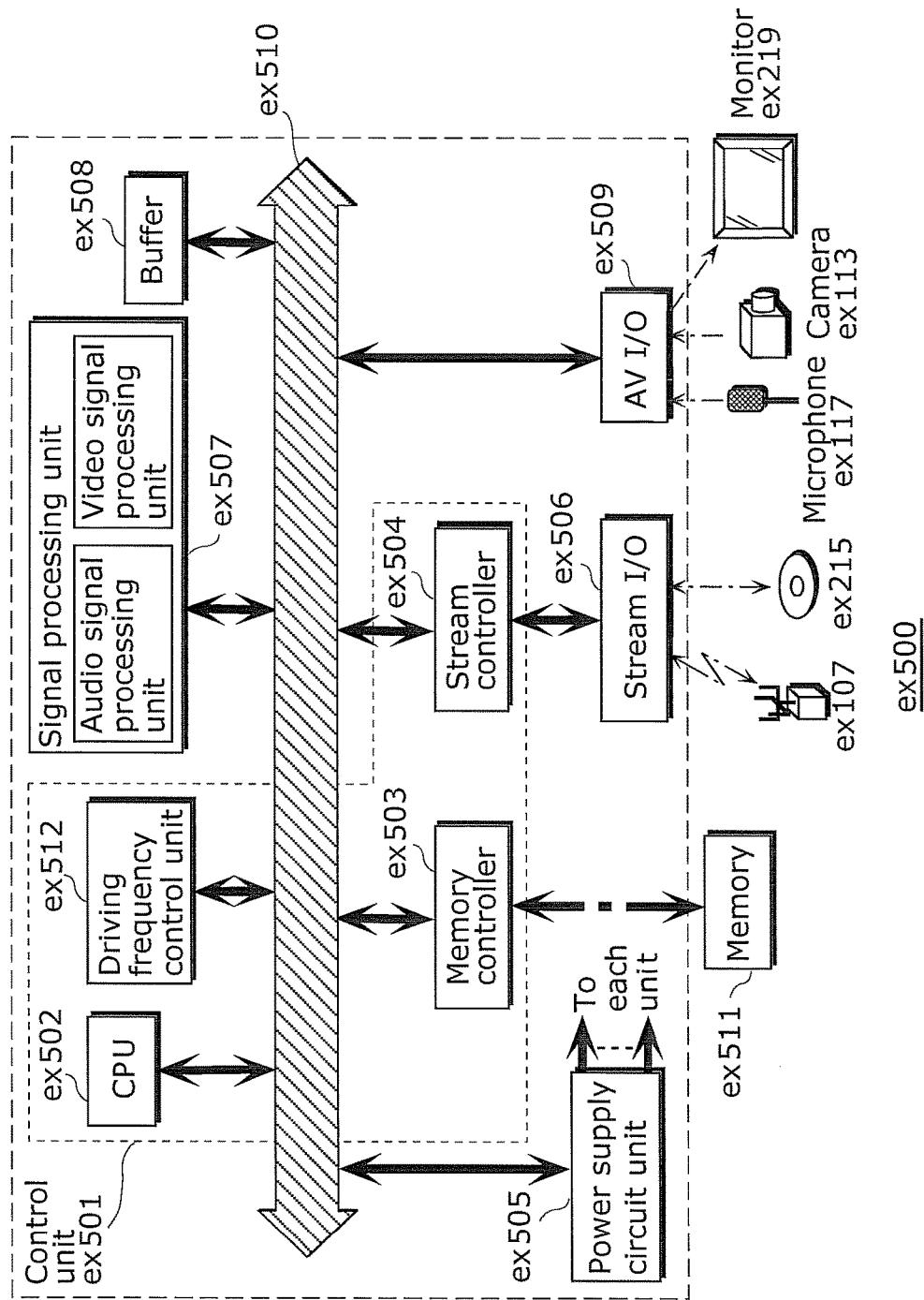
FIG. 24 shows an example of a configuration of an integrated circuit for implementing the moving picture coding method according to each of embodiments.

Each of the moving picture coding method and the moving picture coding apparatus in each of embodiments is typically achieved in the form of an integrated circuit or a Large Scale Integrated (LSI) circuit. As an example of the LSI, FIG. 24 illustrates a configuration of the LSI ex500 that is made into one chip. The LSI ex500 includes elements ex501, ex502, ex503, ex504, ex505, ex506, ex507, ex508, and ex509 to be described below, and the elements are connected to each other through a bus ex510. The power supply circuit unit ex505 is activated by supplying each of the elements with power when the power supply circuit unit ex505 is turned on.

For example, when encoding is performed, the LSI ex500 receives an AV signal from a microphone ex117, a camera ex113, and others through an AV IO ex509 under control of a control unit ex501 including a CPU ex502, a memory controller ex503, a stream controller ex504, and a driving frequency control unit ex512. The received AV signal is temporarily stored in an external memory ex511, such as an SDRAM. Under control of the control unit ex501, the stored data is segmented into data portions according to the processing amount and speed to be transmitted to a signal processing unit ex507. Then, the signal processing unit ex507 encodes an audio signal and/or a video signal. Here, the encoding of the video signal is the encoding described in each of embodiments. Furthermore, the signal processing unit ex507 sometimes multiplexes the encoded audio data and the encoded video data, and a stream IO ex506 provides the multiplexed data outside. The provided multiplexed data is transmitted to the base station ex107, or written on the recording medium ex215. When data sets are multiplexed, the data should be temporarily stored in the buffer ex508 so that the data sets are synchronized with each other.

Although the memory ex511 is an element outside the LSI ex500, it may be included in the LSI ex500. The buffer ex508 is not limited to one buffer, but may be composed of buffers. Furthermore, the LSI ex500 may be made into one chip or a plurality of chips.

Furthermore, although the control unit ex501 includes the CPU ex502, the memory controller ex503, the stream controller ex504, the driving frequency control unit ex512, the configuration of the control unit ex501 is not limited to such. For example, the signal processing unit ex507 may further include a CPU. Inclusion of another CPU in the signal processing unit ex507 can improve the processing speed. Furthermore, as another example, the CPU ex502 may serve as or be a part of the signal processing unit ex507, and, for example, may include an audio signal processing unit. In such a case, the control unit ex501 includes the signal processing unit ex507 or the CPU ex502 including a part of the signal processing unit ex507.

The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. Field Programmable Gate Array (FPGA) that can be programmed after manufacturing LSIs or a reconfigurable processor that allows re-configuration of the connection or configuration of an LSI can be used for the same purpose.

In the future, with advancement in semiconductor technology, a brand-new technology may replace LSI. The functional blocks can be integrated using such a technology. The possibility is that the present disclosure is applied to biotechnology.

Embodiment 5

When video data generated in the moving picture encoding method or by the moving picture encoding apparatus described in each of embodiments is decoded, compared to when video data that conforms to a conventional standard, such as MPEG-2, MPEG-4 AVC, and VC-1 is decoded, the processing amount probably increases. Thus, the LSI ex500 needs to be set to a driving frequency higher than that of the CPU ex502 to be used when video data in conformity with the conventional standard is decoded. However, when the driving frequency is set higher, the power consumption increases.

Figure 25:
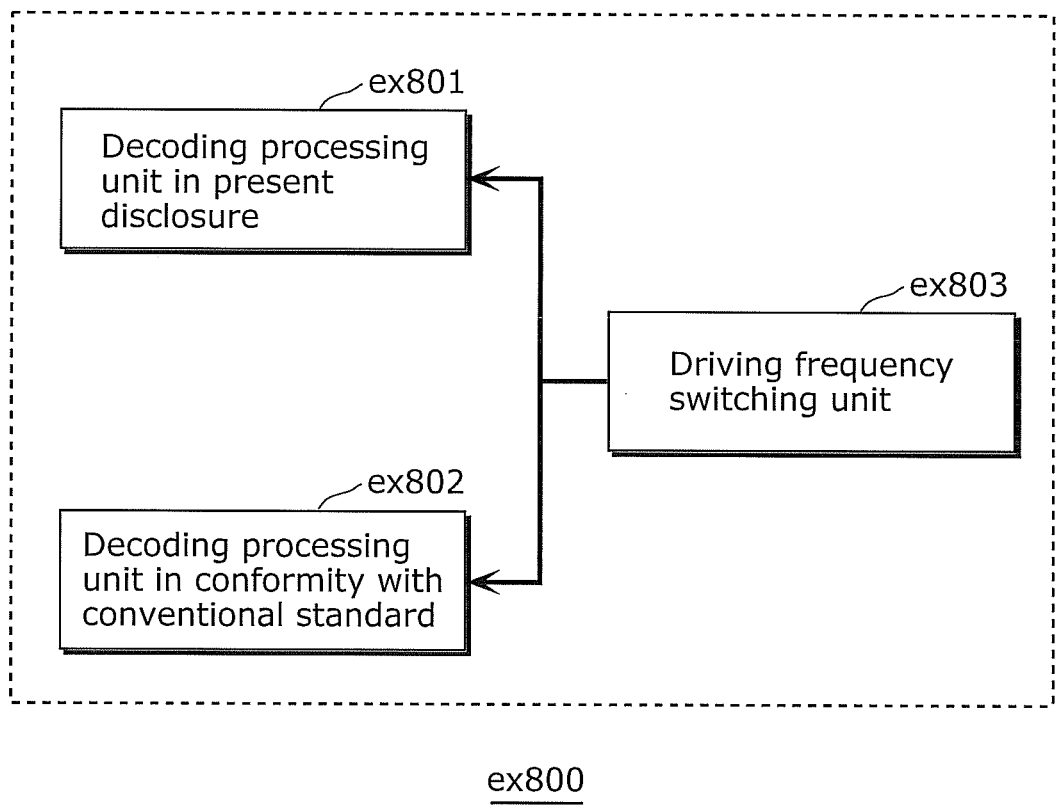
FIG. 25 shows a configuration for switching between driving frequencies.

In view of this, the moving picture decoding apparatus, such as the television ex300 and the LSI ex500 is configured to determine to which standard the video data conforms, and switch between the driving frequencies according to the determined standard. FIG. 25 illustrates a configuration ex800 in the present embodiment. A driving frequency switching unit ex803 sets a driving frequency to a higher driving frequency when video data is generated by the moving picture encoding method or the moving picture encoding apparatus described in each of embodiments. Then, the driving frequency switching unit ex803 instructs a decoding processing unit ex801 that executes the moving picture decoding method described in each of embodiments to decode the video data. When the video data conforms to the conventional standard, the driving frequency switching unit ex803 sets a driving frequency to a lower driving frequency than that of the video data generated by the moving picture encoding method or the moving picture encoding apparatus described in each of embodiments. Then, the driving frequency switching unit ex803 instructs the decoding processing unit ex802 that conforms to the conventional standard to decode the video data.

More specifically, the driving frequency switching unit ex803 includes the CPU ex502 and the driving frequency control unit ex512 in FIG. 24. Here, each of the decoding processing unit ex801 that executes the moving picture decoding method described in each of embodiments and the decoding processing unit ex802 that conforms to the conventional standard corresponds to the signal processing unit ex507 in FIG. 24. The CPU ex502 determines to which standard the video data conforms. Then, the driving frequency control unit ex512 determines a driving frequency based on a signal from the CPU ex502. Furthermore, the signal processing unit ex507 decodes the video data based on the signal from the CPU ex502. For example, the identification information described in Embodiment 3 is probably used for identifying the video data. The identification information is not limited to the one described in Embodiment 3 but may be any information as long as the information indicates to which standard the video data conforms. For example, when which standard video data conforms to can be determined based on an external signal for determining that the video data is used for a television or a disk, etc., the determination may be made based on such an external signal. Furthermore, the CPU ex502 selects a driving frequency based on, for example, a look-up table in which the standards of the video data are associated with the driving frequencies as shown in FIG. 27. The driving frequency can be selected by storing the look-up table in the buffer ex508 and in an internal memory of an LSI, and with reference to the look-up table by the CPU ex502.

Figure 26:
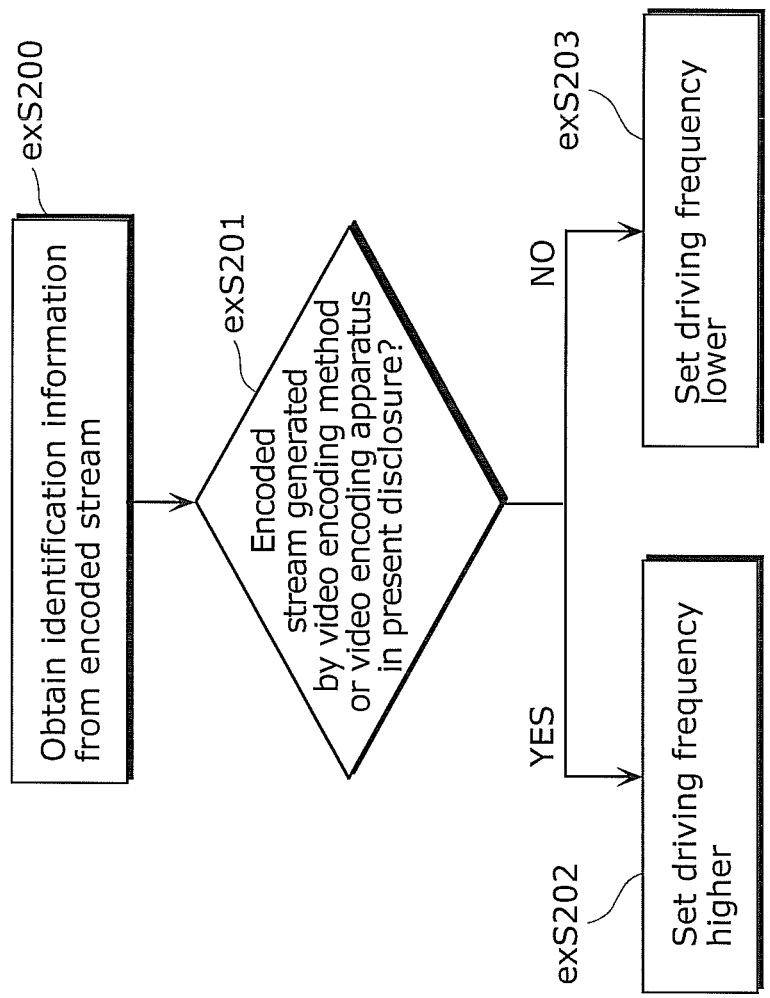
FIG. 26 shows steps for identifying video data and switching between driving frequencies.

FIG. 26 illustrates steps for executing a method in the present embodiment. First, in Step exS200, the signal processing unit ex507 obtains identification information from the multiplexed data. Next, in Step exS201, the CPU ex502 determines whether or not the video data is generated by the encoding method and the encoding apparatus described in each of embodiments, based on the identification information. When the video data is generated by the moving picture encoding method and the moving picture encoding apparatus described in each of embodiments, in Step exS202, the CPU ex502 transmits a signal for setting the driving frequency to a higher driving frequency to the driving frequency control unit ex512. Then, the driving frequency control unit ex512 sets the driving frequency to the higher driving frequency. On the other hand, when the identification information indicates that the video data conforms to the conventional standard, such as MPEG-2, MPEG-4 AVC, and VC-1, in Step exS203, the CPU ex502 transmits a signal for setting the driving frequency to a lower driving frequency to the driving frequency control unit ex512. Then, the driving frequency control unit ex512 sets the driving frequency to the lower driving frequency than that in the case where the video data is generated by the moving picture encoding method and the moving picture encoding apparatus described in each of embodiment.

Furthermore, along with the switching of the driving frequencies, the power conservation effect can be improved by changing the voltage to be applied to the LSI ex500 or an apparatus including the LSI ex500. For example, when the driving frequency is set lower, the voltage to be applied to the LSI ex500 or the apparatus including the LSI ex500 is probably set to a voltage lower than that in the case where the driving frequency is set higher.

Furthermore, when the processing amount for decoding is larger, the driving frequency may be set higher, and when the processing amount for decoding is smaller, the driving frequency may be set lower as the method for setting the driving frequency. Thus, the setting method is not limited to the ones described above. For example, when the processing amount for decoding video data in conformity with MPEG-4 AVC is larger than the processing amount for decoding video data generated by the moving picture encoding method and the moving picture encoding apparatus described in each of embodiments, the driving frequency is probably set in reverse order to the setting described above.

Furthermore, the method for setting the driving frequency is not limited to the method for setting the driving frequency lower. For example, when the identification information indicates that the video data is generated by the moving picture encoding method and the moving picture encoding apparatus described in each of embodiments, the voltage to be applied to the LSI ex500 or the apparatus including the LSI ex500 is probably set higher. When the identification information indicates that the video data conforms to the conventional standard, such as MPEG-2, MPEG-4 AVC, and VC-1, the voltage to be applied to the LSI ex500 or the apparatus including the LSI ex500 is probably set lower. As another example, when the identification information indicates that the video data is generated by the moving picture encoding method and the moving picture encoding apparatus described in each of embodiments, the driving of the CPU ex502 does not probably have to be suspended. When the identification information indicates that the video data conforms to the conventional standard, such as MPEG-2, MPEG-4 AVC, and VC-1, the driving of the CPU ex502 is probably suspended at a given time because the CPU ex502 has extra processing capacity. Even when the identification information indicates that the video data is generated by the moving picture encoding method and the moving picture encoding apparatus described in each of embodiments, in the case where the CPU ex502 has extra processing capacity, the driving of the CPU ex502 is probably suspended at a given time. In such a case, the suspending time is probably set shorter than that in the case where when the identification information indicates that the video data conforms to the conventional standard, such as MPEG-2, MPEG-4 AVC, and VC-1.

Accordingly, the power conservation effect can be improved by switching between the driving frequencies in accordance with the standard to which the video data conforms. Furthermore, when the LSI ex500 or the apparatus including the LSI ex500 is driven using a battery, the battery life can be extended with the power conservation effect.

Embodiment 6

There are cases where a plurality of video data that conforms to different standards, is provided to the devices and systems, such as a television and a cellular phone. In order to enable decoding the plurality of video data that conforms to the different standards, the signal processing unit ex507 of the LSI ex500 needs to conform to the different standards. However, increase in the scale of the circuit of the LSI ex500 and increase in the cost arise with the individual use of the signal processing units ex507 that conform to the respective standards.

Figure 28A:
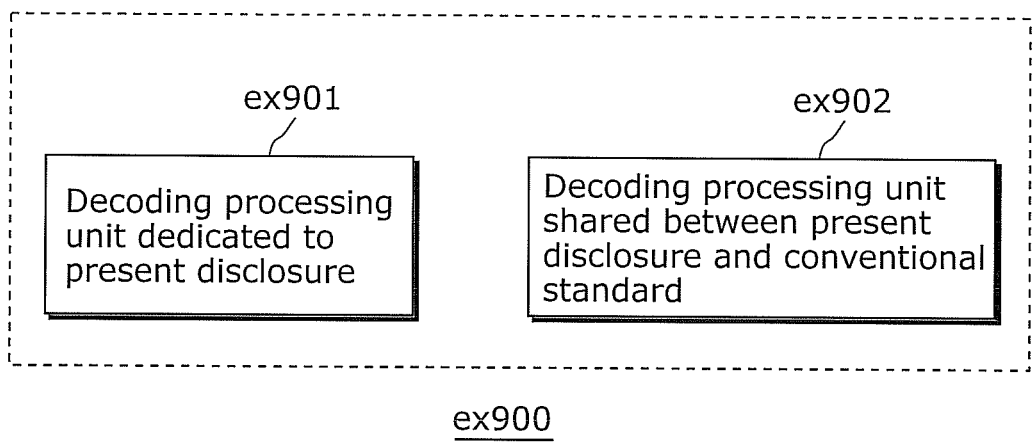
FIG. 28A is a diagram showing an example of a configuration for sharing a module of a signal processing unit.

In view of this, what is conceived is a configuration in which the decoding processing unit for implementing the moving picture decoding method described in each of embodiments and the decoding processing unit that conforms to the conventional standard, such as MPEG-2, MPEG-4 AVC, and VC-1 are partly shared. Ex900 in FIG. 28A shows an example of the configuration. For example, the moving picture decoding method described in each of embodiments and the moving picture decoding method that conforms to MPEG-4 AVC have, partly in common, the details of processing, such as entropy encoding, inverse quantization, deblocking filtering, and motion compensation. The details of processing to be shared probably include use of a decoding processing unit ex902 that conforms to MPEG-4 AVC. In contrast, a dedicated decoding processing unit ex901 is probably used for other processing which is unique to an aspect of the present disclosure and does not conform to MPEG-4 AVC. Since the aspect of the present disclosure is characterized by motion compensation in particular, for example, the dedicated decoding processing unit ex901 is used for motion compensation. Otherwise, the decoding processing unit is probably shared for one of the inverse quantization, entropy decoding, and deblocking filtering, or all of the processing. The decoding processing unit for implementing the moving picture decoding method described in each of embodiments may be shared for the processing to be shared, and a dedicated decoding processing unit may be used for processing unique to that of MPEG-4 AVC.

Figure 28B:
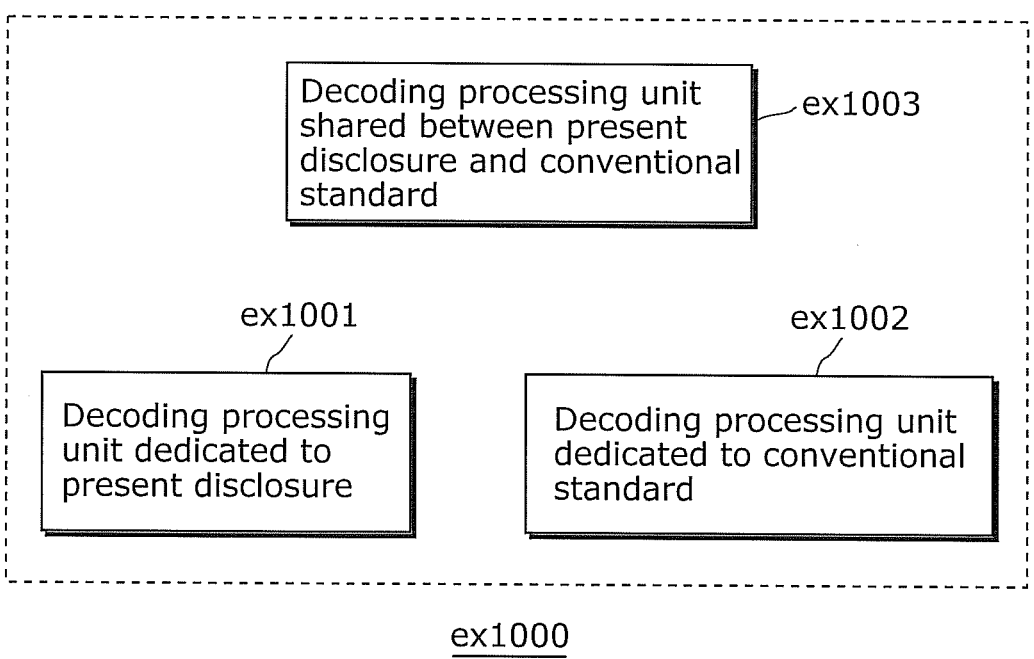
FIG. 28B is a diagram showing another example of a configuration for sharing a module of the signal processing unit.

Furthermore, ex1000 in FIG. 28B shows another example in that processing is partly shared. This example uses a configuration including a dedicated decoding processing unit ex1001 that supports the processing unique to an aspect of the present disclosure, a dedicated decoding processing unit ex1002 that supports the processing unique to another conventional standard, and a decoding processing unit ex1003 that supports processing to be shared between the moving picture decoding method according to the aspect of the present disclosure and the conventional moving picture decoding method. Here, the dedicated decoding processing units ex1001 and ex1002 are not necessarily specialized for the processing according to the aspect of the present disclosure and the processing of the conventional standard, respectively, and may be the ones capable of implementing general processing. Furthermore, the configuration of the present embodiment can be implemented by the LSI ex500.

As such, reducing the scale of the circuit of an LSI and reducing the cost are possible by sharing the decoding processing unit for the processing to be shared between the moving picture decoding method according to the aspect of the present disclosure and the moving picture decoding method in conformity with the conventional standard.

Although only some exemplary embodiments have been described above, the scope of the Claims of the present application is not limited to these embodiments. Those skilled in the art will readily appreciate that various modifications may be made in these exemplary embodiments and that other embodiments may be obtained by arbitrarily combining the structural elements of the embodiments without materially departing from the novel teachings and advantages of the subject matter recited in the appended Claims. Accordingly, all such modifications and other embodiments are included in the present disclosure.

INDUSTRIAL APPLICABILITY

The present disclosure is applicable to an image decoding method and an image decoding apparatus, or an image processing method and an image processing apparatus. Moreover, the present disclosure can be used as a high-resolution information display device or a high-resolution imaging device which includes an image decoding apparatus, such as a television, a digital video recorder, a car navigation system, a cellular phone, a digital camera, and a digital video camera.

The invention claimed is:
1. An image decoding method for decoding a coded signal, the image decoding method comprising:
   decoding first reference picture information for identifying one or more first reference pictures, from a picture header included in the coded signal;
   determining whether or not a second reference picture is stored in a buffer, the second reference picture being one of the one or more first reference pictures;
   determining, when the second reference picture is not stored in the buffer, a picture closest in display order to the second reference picture, among pictures stored in the buffer, to be a third reference picture;
   decoding a current picture from the coded signal, using the third reference picture; and
   performing a random access operation to skip decoding of a picture between a picture last decoded before the random access operation and a picture to be decoded first after the random access operation,
   wherein when the current picture is the picture to be decoded first after the random access operation and the second reference picture is the picture of which decoded is skipped, in the determining of a third reference picture, the picture last decoded before the random access operation or a picture which is last in display order before the random access operation, among the pictures stored in the buffer, is determined to be the third reference picture.
2. The image decoding method according to claim 1, further comprising
   generating second reference picture information which is used in common in a picture and identifies one or more fourth reference pictures, the one or more fourth reference pictures being derived by replacing, among the one or more first reference pictures, the second reference picture with the third reference picture,
   wherein, in the decoding of a current picture, the third reference picture is selected from the one or more fourth reference pictures, using the second reference picture information.
3. The image decoding method according to claim 2,
   wherein the second reference picture information is a reference picture list indicating a correspondence relationship between (i) a reference index which is included in the coded signal and indicates a reference picture to be used, and (ii) the reference picture stored in the buffer.
4. The image decoding method according to claim 1,
   wherein, in the determining of a third reference picture, when a plurality of pictures closest in display order to the second reference picture are present, a picture closest in display order to the current picture, among the plurality of pictures, is determined to be the third reference picture.

5. The image decoding method according to claim 1, wherein in the decoding of a first reference picture:
a header of a picture unit is identified using information which is included in a slice header of a current slice included in the current picture and identifies the header of the picture unit;
a header of a unit of pictures is identified using information which is included in the identified header of the picture unit and identifies the header of the unit of the pictures, the header of the unit of the pictures being the picture header; and
the first reference picture information is obtained from the identified header of the unit of the pictures.

6. The image decoding method according to claim 1, wherein the first reference picture information is information indicating a difference in display order between each of the one or more first reference pictures and the current picture.

7. An image decoding apparatus which decodes a coded signal, the image decoding apparatus comprising:
processing circuitry; and
storage accessible from the processing circuitry,
wherein the processing circuitry executes, using the storage, the image decoding method according to claim 1.

8. An image decoding apparatus which decodes a coded signal, the image decoding apparatus comprising:
a first reference picture information decoding unit configured to decode first reference picture information for identifying one or more first reference pictures which are referable by a current picture, from a picture header included in the coded signal;
a determination unit configured to determine whether or not a second reference picture is stored in a buffer, the second reference picture being one of the one or more first reference pictures;
a third reference picture determination unit configured to determine, when the second reference picture is not stored in the buffer, a picture closest in display order to the second reference picture, among pictures stored in the buffer, to be a third reference picture;
a current picture decoding unit configured to decode the current picture from the coded signal, using the third reference picture,
wherein the current picture decoding unit is further configured to perform a random access operation to skip decoding of a picture between a picture last decoded before the random access operation and a picture to be decoded first after the random access operation, and
wherein when the current picture is the picture to be decoded first after the random access operation and the second reference picture is the picture of which decoded is skipped, in the determining of a third reference picture, the third reference picture determination unit determines the picture last decoded before the random access operation or a picture which is last in display order before the random access operation, among the pictures stored in the buffer, to be the third reference picture.

* * * * *